(12) United States Patent
Huang et al.

(10) Patent No.: US 10,554,097 B2
(45) Date of Patent: Feb. 4, 2020

(54) HOLLOW MOTOR APPARATUSES AND ASSOCIATED SYSTEMS AND METHODS

(71) Applicant: SZ DJI TECHNOLOGY CO., LTD., Shenzhen (CN)

(72) Inventors: Huai Huang, Shenzhen (CN); Jin Zhao, Shenzhen (CN); Peng Wang, Shenzhen (CN); Xiaoping Hong, Shenzhen (CN); Zhenhao Zhou, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/729,518

(22) Filed: Oct. 10, 2017

(65) Prior Publication Data

US 2018/0287459 A1 Oct. 4, 2018

Related U.S. Application Data

(63) Continuation of application No. PCT/CN2017/078678, filed on Mar. 29, 2017.

(51) Int. Cl.
*H02K 7/14* (2006.01)
*G02B 26/10* (2006.01)
(Continued)

(52) U.S. Cl.
CPC ............. *H02K 7/14* (2013.01); *B64C 39/024* (2013.01); *G02B 26/0875* (2013.01);
(Continued)

(58) Field of Classification Search
CPC .................................. H02K 7/14; H02K 7/145
See application file for complete search history.

(56) References Cited

U.S. PATENT DOCUMENTS 3,615,140 A * 10/1971 Doornekamp et al. ...................... G01P 3/486
250/574
4,283,116 A 8/1981 Weis
(Continued)

FOREIGN PATENT DOCUMENTS

| CN | 1396691 | 2/2003 |
|---|---|---|
| CN | 1801585 | 7/2006 |

(Continued)

OTHER PUBLICATIONS

Aijazi, et al., "Segmentation Based Classification of 3D Urban Point Clouds: A Super-Voxel Based Approach with Evaluation," (2013), 27 pages.

(Continued)

*Primary Examiner* — Terrance L Kenerly
(74) *Attorney, Agent, or Firm* — Finnegan, Henderson, Farabow, Garrett & Dunner, LLP

(57) ABSTRACT

Hollow motor apparatuses and associated systems and methods for manufacturing the same are disclosed herein. In representative embodiment, a hollow motor apparatus includes a rotor assembly rotatable about a rotation axis, a stator assembly positioned adjacent to the rotor assembly and coaxially with the rotor assembly relative to the rotation axis, and a bearing assembly operably coupled to the rotor assembly. The rotor assembly has an inner portion around an opening configured to receive at least a portion of a payload. The bearing assembly is disposed outside the inner portion of the rotor assembly and is configured to maintain a position of the rotor assembly relative to the stator assembly.

28 Claims, 27 Drawing Sheets

(51) Int. Cl.
    *H02K 1/27* (2006.01)
    *H02K 1/14* (2006.01)
    *H02K 7/08* (2006.01)
    *B64C 39/02* (2006.01)
    *G02B 26/08* (2006.01)
    *H02K 7/116* (2006.01)

(52) U.S. Cl.
    CPC ....... *G02B 26/0883* (2013.01); *G02B 26/108* (2013.01); *H02K 1/148* (2013.01); *H02K 1/27* (2013.01); *H02K 1/2706* (2013.01); *H02K 7/085* (2013.01); *H02K 7/088* (2013.01); *B64C 2201/042* (2013.01); *B64C 2201/108* (2013.01); *H02K 7/116* (2013.01)

(56) References Cited

U.S. PATENT DOCUMENTS

| | | |
|---|---|---|
| 5,179,565 A | 1/1993 | Tsuchiya et al. |
| 5,249,046 A | 9/1993 | Ulich et al. |
| 5,313,244 A | 5/1994 | Arai |
| 6,101,455 A | 8/2000 | Davis |
| 6,246,258 B1 | 6/2001 | Lesea |
| 6,344,937 B1 | 2/2002 | Sparrold et al. |
| 6,666,855 B2 | 12/2003 | Somani et al. |
| 6,911,749 B1 | 6/2005 | Ho et al. |
| 7,085,400 B1 | 8/2006 | Holsing et al. |
| 7,236,299 B1 | 6/2007 | Smith et al. |
| 7,336,407 B1 | 2/2008 | Adams et al. |
| 7,564,571 B2 | 7/2009 | Karabassi et al. |
| 7,843,448 B2 | 11/2010 | Wheeler et al. |
| 7,899,598 B2 | 3/2011 | Woon et al. |
| 8,224,097 B2 | 7/2012 | Matei et al. |
| 8,396,293 B1 | 3/2013 | Korah et al. |
| 8,488,877 B1 | 7/2013 | Owechko et al. |
| 8,503,046 B2 | 8/2013 | Mikkelsen et al. |
| 8,605,998 B2 | 12/2013 | Samples et al. |
| 8,620,089 B1 | 12/2013 | Korah et al. |
| 8,665,122 B2 | 3/2014 | Klepsvik |
| 8,773,182 B1 | 7/2014 | Degani et al. |
| 8,798,372 B1 | 8/2014 | Korchev et al. |
| 9,076,219 B2 | 7/2015 | Cha et al. |
| 9,097,804 B1 | 8/2015 | Silver et al. |
| 9,098,753 B1 | 8/2015 | Zhu et al. |
| 9,128,190 B1 | 9/2015 | Ulrich et al. |
| 9,174,733 B1 | 11/2015 | Burgess et al. |
| 9,369,697 B2 | 6/2016 | Kumagai et al. |
| 9,383,753 B1 | 7/2016 | Templeton et al. |
| 9,396,545 B2 | 7/2016 | Fu et al. |
| 9,470,548 B2 | 10/2016 | Ahn et al. |
| 9,584,748 B2 | 2/2017 | Saito |
| 9,644,857 B1 | 5/2017 | Ashgriz et al. |
| 9,659,378 B2 | 5/2017 | Sasaki et al. |
| 2004/0135992 A1 | 7/2004 | Munro |
| 2005/0248749 A1 | 11/2005 | Kiehn et al. |
| 2005/0254628 A1 | 11/2005 | Saladin et al. |
| 2007/0214687 A1 | 9/2007 | Woon et al. |
| 2007/0296951 A1 | 12/2007 | Kuijk et al. |
| 2008/0046905 A1 | 2/2008 | Takaki et al. |
| 2008/0114253 A1 | 5/2008 | Randall et al. |
| 2008/0319706 A1 | 12/2008 | Uffenkamp et al. |
| 2009/0310867 A1 | 12/2009 | Matei et al. |
| 2010/0271615 A1 | 10/2010 | Sebastian et al. |
| 2011/0285981 A1 | 11/2011 | Justice et al. |
| 2012/0032541 A1* | 2/2012 | Chen ............ H02K 7/116 310/83 |
| 2012/0121166 A1 | 5/2012 | Ko et al. |
| 2012/0170024 A1 | 7/2012 | Azzazy et al. |
| 2012/0170029 A1 | 7/2012 | Azzazy et al. |
| 2012/0248288 A1 | 10/2012 | Linder et al. |
| 2012/0256916 A1 | 10/2012 | Kitamura et al. |
| 2013/0107243 A1 | 5/2013 | Ludwig et al. |
| 2013/0284475 A1* | 10/2013 | Hirabayashi ........... B25F 5/008 173/47 |
| 2013/0329065 A1* | 12/2013 | Haraguchi ............... G03B 5/00 348/208.11 |
| 2014/0049765 A1 | 2/2014 | Zheleznyak et al. |
| 2014/0071121 A1 | 3/2014 | Russ et al. |
| 2014/0132723 A1 | 5/2014 | More |
| 2014/0368651 A1 | 12/2014 | Irschara et al. |
| 2015/0185313 A1 | 7/2015 | Zhu |
| 2015/0206023 A1 | 7/2015 | Kochi et al. |
| 2015/0219920 A1* | 8/2015 | Ando ................. H02K 41/0354 359/557 |
| 2016/0070981 A1 | 3/2016 | Sasaki et al. |
| 2016/0154999 A1 | 6/2016 | Fan et al. |
| 2016/0311528 A1* | 10/2016 | Nemovi ................. B64C 27/82 |
| 2016/0327779 A1 | 11/2016 | Hillman |
| 2017/0046840 A1 | 2/2017 | Chen et al. |
| 2017/0046845 A1 | 2/2017 | Boyle et al. |
| 2017/0153319 A1 | 6/2017 | Villeneuve et al. |
| 2017/0178352 A1 | 6/2017 | Harmsen et al. |
| 2017/0227628 A1 | 8/2017 | Zheleznyak et al. |
| 2017/0248698 A1 | 8/2017 | Sebastian et al. |
| 2017/0316701 A1* | 11/2017 | Gil ........................ B64C 39/024 |

FOREIGN PATENT DOCUMENTS

| | | |
|---|---|---|
| CN | 1971328 | 5/2007 |
| CN | 200964962 | 10/2007 |
| CN | 101123384 | 2/2008 |
| CN | 101131838 A | 2/2008 |
| CN | 101191892 A | 6/2008 |
| CN | 101216562 A | 7/2008 |
| CN | 101256232 A | 9/2008 |
| CN | 201470111 U | 5/2010 |
| CN | 201936055 | 8/2011 |
| CN | 202182717 U | 4/2012 |
| CN | 102508255 A | 6/2012 |
| CN | 202330837 U | 7/2012 |
| CN | 202617246 | 12/2012 |
| CN | 102944224 A | 2/2013 |
| CN | 102971657 A | 3/2013 |
| CN | 103257342 A | 8/2013 |
| CN | 103257348 A | 8/2013 |
| CN | 103403577 A | 11/2013 |
| CN | 103499819 A | 1/2014 |
| CN | 103715820 A | 4/2014 |
| CN | 203645633 U | 6/2014 |
| CN | 103969637 A | 8/2014 |
| CN | 103983963 A | 8/2014 |
| CN | 104360479 | 2/2015 |
| CN | 104463872 A | 3/2015 |
| CN | 104469283 A | 3/2015 |
| CN | 104600902 A | 5/2015 |
| CN | 104635313 A | 5/2015 |
| CN | 105143091 A | 12/2015 |
| CN | 105217050 A | 1/2016 |
| CN | 105245079 | 1/2016 |
| CN | 105292455 A | 2/2016 |
| CN | 105438439 A | 3/2016 |
| CN | 105517903 A | 4/2016 |
| CN | 105518980 | 4/2016 |
| CN | 105628026 A | 6/2016 |
| CN | 105759253 A | 7/2016 |
| CN | 106019296 A | 10/2016 |
| CN | 106019923 A | 10/2016 |
| CN | 106027915 A | 10/2016 |
| CN | 106030431 A | 10/2016 |
| CN | 106063089 A | 10/2016 |
| CN | 205656416 | 10/2016 |
| CN | 106093958 A | 11/2016 |
| CN | 106093963 A | 11/2016 |
| CN | 205681237 U | 11/2016 |
| CN | 106199622 A | 12/2016 |
| CN | 205813404 U | 12/2016 |
| CN | 106460928 A | 2/2017 |
| CN | 106481659 A | 3/2017 |
| CN | 206041726 U | 3/2017 |
| CN | 106597414 A | 4/2017 |
| CN | 106597416 A | 4/2017 |
| CN | 107037721 A | 8/2017 |
| EP | 3349331 A1 | 7/2018 |

(56) References Cited

FOREIGN PATENT DOCUMENTS

| | | | | |
|---|---|---|---|---|
| JP | 63194211 | * | 2/1987 | ............... G02B 7/04 |
| JP | H06334905 | | 12/1994 | |
| JP | H 10319300 | A | 12/1998 | |
| JP | 2002199682 | A | 7/2002 | |
| JP | 2002350709 | A | 12/2002 | |
| JP | 2004254357 | | 9/2004 | |
| JP | 2005321547 | A | 11/2005 | |
| JP | 2015200555 | A | 11/2015 | |
| JP | 6076541 | B2 | 2/2017 | |
| JP | 2017046488 | A | 3/2017 | |
| KR | 101665938 | B1 | 10/2016 | |
| WO | 2006086077 | A2 | 8/2006 | |
| WO | WO 2013/066475 | A2 | 5/2013 | |
| WO | 2015148824 | A1 | 10/2015 | |
| WO | 2016127357 | A1 | 8/2016 | |
| WO | 2016170333 | A1 | 10/2016 | |
| WO | 2017021778 | A2 | 2/2017 | |

OTHER PUBLICATIONS

Douillard, et al., "On the Segmentation of 3D LIDAR Point Clouds," (2011), 8 pages.

Hackel, et al., "Fast Semantic Segmentation of 3D Point Clouds with Strongly Varying Density," (2016), 8 pages.

Levinson, et al., "Automatic Online Calibration of Cameras and Lasers," (2013), 8 pages.

Liu, et al., "A 3.9 ps. RMS Resolution Time-To-Digital Converter Using Dual-sampling Method on Kintex UltraScale FPGA," (2006), 2 pages.

Montemerlo, et al., "Junior: The Stanford Entry in the Urban Challenge," (2008), 31 pages.

Palka, et al., "A Novel Method Based Solely on FPGA Units Enabling Measurement of Time and Charge of Analog Signals in Positron Emission Tomography," (2014), 6 pages.

Raismian, "Google Cars Autonomous Driving," (2017), 1 pages.

Schwarze, "A New Look at Risley Prisms," (2006), 5 pages.

Tongtong, et al., "Gaussian-Process-Based Real-Time Ground Segmentation for Autonomous Land Vehicles," (2014), 25 pages.

Wu, et al., "Several Key Issues on Implementing Delay Line Based TDCs using FPGA," (2009), 6 pages.

International Searching Authority, International Search Report and the Written Opinion of the International Searching Authority, PCT Application PCT/CN2017/078611, dated Dec. 29, 2017, 12 pages.

International Searching Authority, The International Search Report and Written Opinion of the International Search Authority, PCT/CN2017/095300, dated Apr. 27, 2018, 9 pages.

International Searching Authority, International Search Report, PCT/CN2017/078680, dated Jan. 3, 2018., 6 pages (incl. translation).

International Searching Authority, International Search Report, PCT/CN2017/078681, dated Jan. 3, 2018., 6 pages (incl. translation).

International Searching Authority, International Search Report, PCT/CN2017/078682, dated Jan. 4, 2018., 6 pages (incl. translation).

* cited by examiner

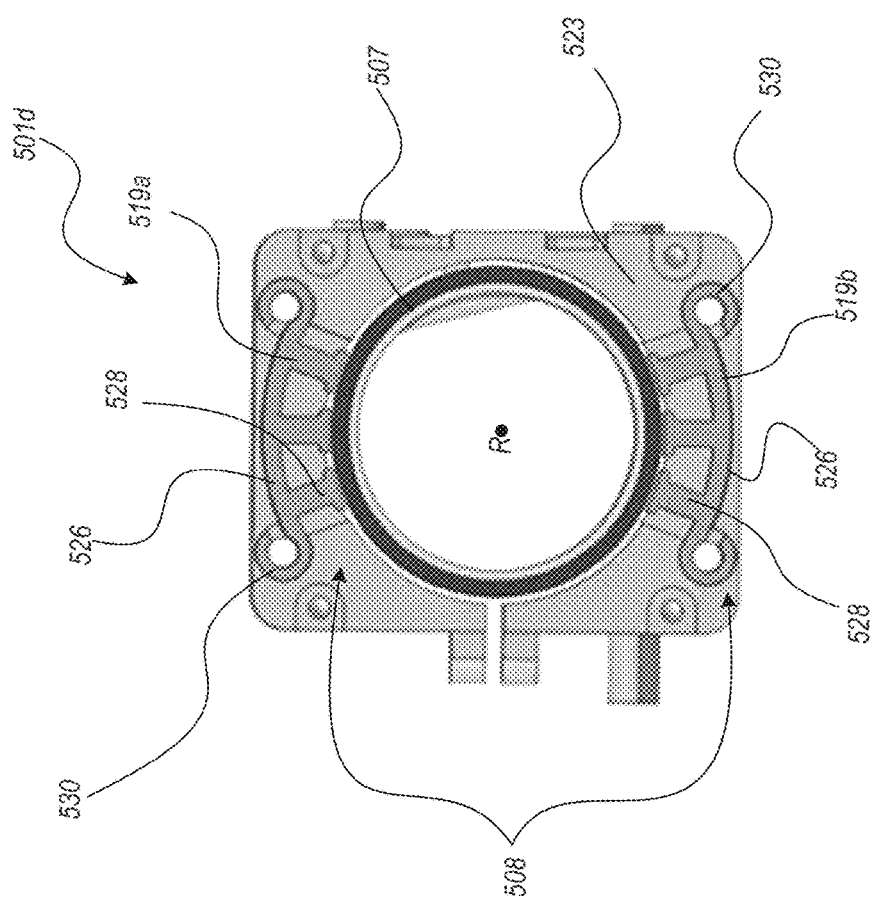

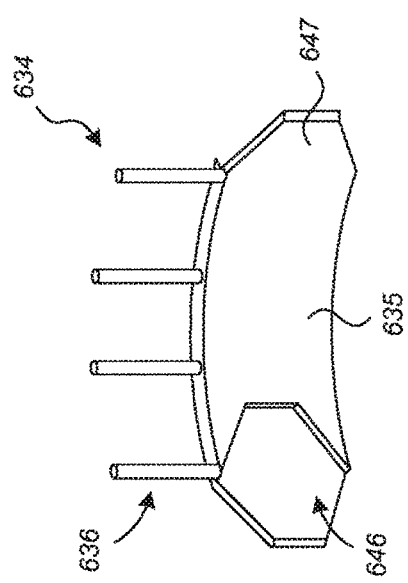

US 10,554,097 B2

HOLLOW MOTOR APPARATUSES AND ASSOCIATED SYSTEMS AND METHODS

CROSS REFERENCE TO RELATED APPLICATION

The present application is a continuation of International Patent Application No. PCT/CN17/78678, filed Mar. 29, 2017, which is incorporated here by reference.

TECHNICAL FIELD

The present technology is directed generally to hollow motor apparatuses, associated systems, and methods for manufacturing the same. More particularly, embodiments of the present technology relate to a hollow motor that can accommodate a component (e.g., a light source, a lens, and/or other suitable components) therein.

BACKGROUND

Traditionally, an electrical motor includes a stator and a rotor rotatable relative to the stator. The rotor includes a magnet and the stator includes a set of winding wires. When an electrical current passes through the winding wires, a magnetic field is formed which then rotates the rotor relative to the stator. There are various structural designs for the electrical motor. For example, an "inner-rotor" type electrical motor has a rotor positioned generally internal to the stator. On the contrary, an "outer-rotor" type electrical motor has a rotor positioned generally external to the stator. In general, traditional electrical motors are not suitable for positioning additional rotatable components/elements therein at least because they do not have sufficient space to accommodate such components/elements. Due to a need for driving a rotatable component positioned in an electrical motor, it is beneficial to have an improved apparatus or system to address this need.

SUMMARY

The following summary is provided for the convenience of the reader and identifies several representative embodiments of the disclosed technology. Generally speaking, the present technology provides an improved hollow motor apparatus that enables a user to position a component (an element, a module, and/or other suitable devices) therein such that the component can rotate with a rotor assembly of the hollow motor apparatus. For example, embodiments of the present technology include a hollow electrical motor that has an interior space (or an opening) to accommodate one or more optical components (e.g., lenses, prisms, and/or other suitable optical devices) and/or a light source (e.g., a light source emitting visible or non-visible radiation, a laser emitter, and/or other suitable light sources).

In some embodiments, the optical component rotates with the rotor assembly and the light source does not rotate with the rotor assembly (e.g., the light source is fixedly coupled to a stator assembly of the hollow electrical motor). In some embodiments, both the optical component and the light source can rotate with the rotor assembly. In such embodiments, various aspects of the light emitted from the light source (e.g., by changing an emitting angle, a color, a brightness, and/or other suitable parameters) can be configured or adjusted so as to perform scanning, ranging, signifying different statuses of the UAV and/or performing other functions.

By rotating the optical component, the user can direct the light emitted from the light source in desirable directions. For example, the present technology enables the user to generate a set of focused light rays (or a set of parallel light rays, in other embodiments). The focused light rays (e.g., laser rays) can be used to transmit information to the user of a moveable apparatus (e.g., a vehicle or a UAV) coupled to the hollow electrical motor. In some embodiments, the focused light rays can be used for ranging and scanning objects or obstacles in a surrounding environment of the moveable apparatus. The hollow electrical motor can also be used to drive the moveable apparatus (e.g., by coupling to and rotating a propeller). Accordingly, embodiments of the present technology provide an improved hollow electrical motor that can (1) rotate optical components positioned in a compact hollow structure (e.g., a range finder or a Lidar system); and (2) drive a UAV and signify a status of the UAV.

Representative embodiments of the present technology include a hollow motor apparatus having a rotor assembly, a stator assembly, and a positioning component (e.g., a bearing assembly) positioned to maintain a location of the rotor assembly relative to the stator assembly. The rotor assembly is positioned to be rotatable about a rotation axis (e.g., an axis passing through the rotation center of the rotor assembly when it is rotating). The rotor assembly has an inner portion and an outer portion. The inner portion circumferentially faces the rotation axis and bounds, at least in part, an interior chamber for accommodating a component to be positioned inside the hollow motor apparatus. The bearing assembly is positioned external to the inner portion of the rotor assembly (e.g., farther away from the rotation axis). In some embodiments, the bearing assembly is operably (e.g., rotatably) coupled to the rotor assembly and the stator assembly. The bearing assembly can rotate relative to the rotor assembly and/or the stator assembly while maintaining the relative locations of the rotor/stator assemblies. The bearing assembly can include a bearing, a rolling ball, a rolling pin, and/or other suitable devices. In some embodiments, additional components, such as a set of lens or prisms, can be positioned in the interior space and coupled to the rotor assembly.

Some embodiments of the present technology provide a hollow apparatus having an annular structure, an optical component, and a driving assembly. The annular structure (which can include, for example, a hollow cylinder, a pipe-shaped structure, and/or other suitable hollow structures) is positioned to be rotatable about a rotation axis. The annular structure has an inner portion, which circumferentially faces the rotation axis and bounds (or defines), at least in part, an interior chamber (or an opening). The interior chamber is used to accommodate the optical component, which is carried by the annular structure. The driving assembly is configured to rotate the annular structure (with the optical component) so as to position the optical component at a particular (angular) location (e.g., such that the optical component can direct light from a light source to a desirable target area). In some embodiments, the driving assembly can be a stator assembly and the annular structure can be a rotor assembly. In some embodiments, the driving assembly can include a driving component (e.g., a motor or a means that can rotate other components). In some embodiments, the driving component can be coupled to the rotor assembly via a positioning component (e.g., a belt, a gear, a pulley and/or other suitable devices) that is positioned/configured to maintain a location of the annular structure relative to the driving assembly.

Some embodiments of the present technology can be implemented as methods for manufacturing and/or using a hollow motor apparatus. A representative method can include, inter alia, (1) performing a rotation-balance analysis on an optical component to generate an analysis result; (2) at least partially based on the analysis result, weight-balancing the optical component; (3) positioning the optical component in an interior chamber defined at least in part by an inner portion of a rotor assembly; (4) coupling the optical component to the rotor assembly; (5) coupling the rotor assembly to a bearing assembly; and (6) coupling the bearing assembly to a stator assembly. The bearing assembly is positioned external to the inner portion of the rotor assembly so as to maintain a location (e.g., a radial location relative to a rotation axis of the rotor assembly) of the rotor assembly relative to the stator assembly. Methods and systems in accordance with embodiments of the present technology can include any one or a combination of any of the foregoing elements described above.

The present technology also includes a method for balancing a rotatable component to be positioned inside the hollow motor apparatus. The method includes, for example, (1) determining the shape and the density of the rotatable component; (2) performing a weight-balance test at multiple planes (which are generally perpendicular to a rotation axis about which the rotatable component rotates); (3) consolidating the results of the weight-balance test for the multiple planes; (4) determining a counterweight (or a portion of the rotatable component that needs to be removed) to be coupled to the rotatable component (or to a rotor assembly coupled to the rotatable component) and an expected location of the counterweight; and (5) positioning the counterweight at the expected location. In some embodiments, the method can be used to balance multiple rotatable components. In such embodiments, the multiple rotatable components can rotate at different rotational speeds (e.g., driven by different motors or driven by different gears coupled to one motor).

In some embodiments, the present technology enables a user to determine a combination of rotatable components to be installed in a hollow motor apparatus so as to perform desirable functions described above. For example, a user can select a combination of a focusing lens, a coloring lens, and a point light source. In this embodiment, the selected combination can generate a focused light beam with a specific color. As another example, the user can select two asymmetrical lenses and a laser light source. In this embodiment, the selected combination can generate multiple laser rays that can be properly distributed in a target area (e.g., the two asymmetrical lenses can rotate at different rotational speeds and directions, so as to achieve this goal). In such embodiments, the reflected laser rays can be received and then be used to measure the distance between the target area and the laser light source (or a surface feature, contour, terrain, and/or other suitable parameters of the target area). Having a proper distribution of laser rays in the target area can be beneficial at because this can effectively increase the accuracy of the related measurement.

BRIEF DESCRIPTION OF THE DRAWINGS

FIG. 5D includes an end view illustrating components of yet another hollow motor assembly configured in accordance with representative embodiments of the present technology.

FIG. 6D is an isometric view illustrating a stator segment configured in accordance with representative embodiments of the present technology.

DETAILED DESCRIPTION

1. Overview

Figure 1B:
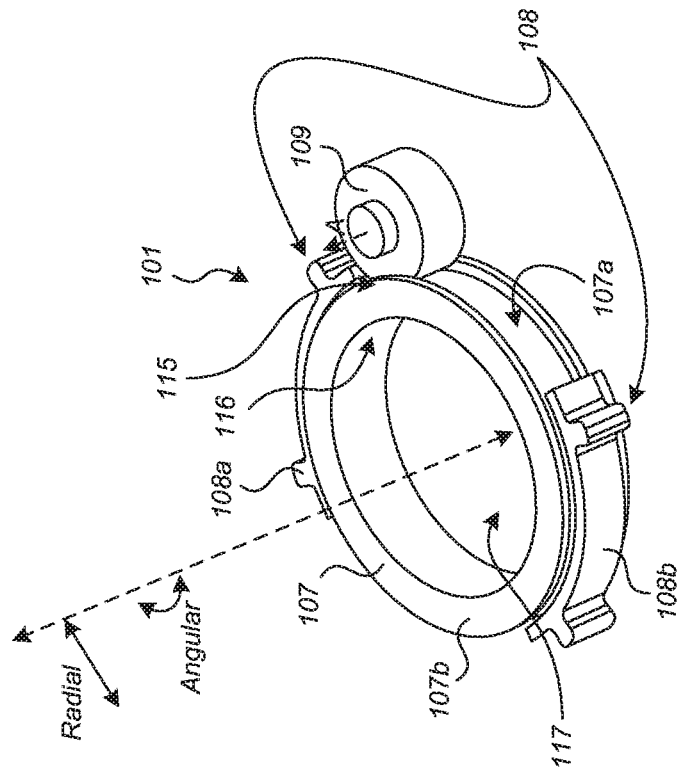
FIG. 1B is an isometric view illustrating components of a hollow motor assembly configured in accordance with representative embodiments of the present technology.

The present technology is directed generally to hollow motor apparatuses and associated systems and methods. A representative hollow motor apparatus in accordance with the present technology can be used to (1) provide power to move a moveable device (e.g., a UAV); (2) visually present indications or signals that relate to a status of the moveable device (e.g., an indication that the UAV is low on battery power) or other information that an operator of the moveable device wants to convey; and/or (3) detect the status of an object outside the moveable device. For example, the operator can use a laser light source positioned in the hollow apparatus to detect the existence of (or the distance to) an obstacle outside the moveable device. A representative hollow motor apparatus in accordance with the present technology includes a hollow structure that can be used to accommodate a component or payload (e.g., a lens, a prism, a light source, and/or other suitable devices) that (1) is positioned inside the hollow motor apparatus, and (2) is rotatable with a rotor assembly (or an annular structure) of the hollow motor apparatus. Via this arrangement, the moveable device can have additional functions (e.g., visually presenting information and/or detecting an object) without requiring extra space for installing additional parts/components. In other words, the present technology efficiently utilizes the interior space inside the hollow motor apparatus to make additional functions possible.

Several details describing structures or processes that are well-known and often associated with electrical motors and corresponding systems and subsystems, but that may unnecessarily obscure some significant aspects of the disclosed technology, are not set forth in the following description for purposes of clarity. Moreover, although the following disclosure sets forth several embodiments of different aspects of the technology, several other embodiments can have different configurations and/or different components than those described in this section. Accordingly, the technology may have other embodiments with additional elements and/or without several of the elements described below with reference to FIGS. 1-13.

FIGS. 1-13 are provided to illustrate representative embodiments of the disclosed technology. Unless provided for otherwise, the drawings are not intended to limit the scope of the claims in the present application. Many embodiments of the technology described below may take the form of computer- or controller-executable instructions, including routines executed by a programmable computer or controller. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any suitable data processor and can include Internet appliances and handheld devices (including palm-top computers, wearable computers, cellular or mobile phones, multi-processor systems, processor-based or programmable consumer electronics, network computers, mini computers, a programmed computer chip, and the like). Information handled by these computers and controllers can be presented at any suitable display medium, including a CRT display or an LCD. Instructions for performing computer- or controller-executable tasks can be stored in or on any suitable computer-readable medium, including hardware, firmware or a combination of hardware and firmware. Instructions can be contained in any suitable memory device, including, for example, a flash drive, USB device, or other suitable medium. In particular embodiments, the term "component" can include hardware, firmware, or a set of instructions stored in a computer-readable medium.

2. Representative Embodiments

Figure 1A:
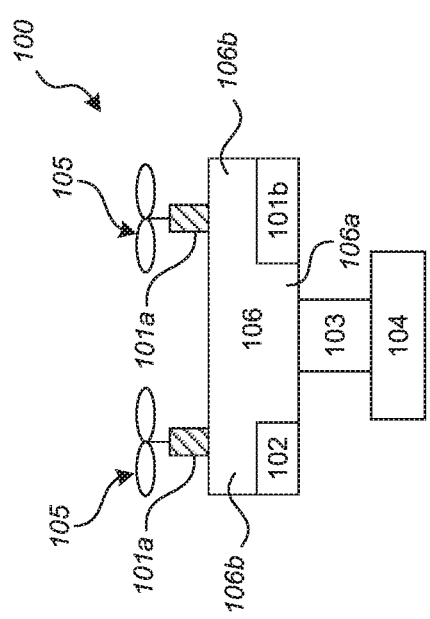
FIG. 1A is a schematic diagram illustrating a UAV having a hollow motor assembly configured in accordance with representative embodiments of the present technology.

FIG. 1A is a schematic diagram illustrating a UAV 100 having a hollow motor assembly 101 configured in accordance with representative embodiments of the present technology. As shown in FIG. 1A, the UAV 100 includes an airframe (or a main body) 106, a UAV controller 102 carried by the UAV 100 and configured to control the UAV 100, a gimbal 103 coupled to the airframe 106, and a UAV payload 104 coupled to and carried by the gimbal 103. In some embodiments, the UAV payload 104 can include an imaging device. In particular embodiments, the imaging device can include an image camera (e.g., a camera that is configured to capture video data, still data, or both). The camera can be sensitive to wavelengths in any of a variety of suitable wavelength bands, including visual, ultraviolet, infrared or combinations thereof. In still further embodiments, the UAV payload 104 can include other types of sensors, other types of cargo (e.g., packages or other deliverables), or both. In many of these embodiments, the gimbal 103 supports the UAV payload 104 in a way that allows the UAV payload 104 to be independently positioned relative to the airframe 106. Accordingly, for example, when the UAV payload 104 includes an imaging device, the imaging device can be moved relative to the airframe 106 to track a target.

The airframe 106 can include a central portion 106a and one or more outer portions 106b. In particular embodiments, the airframe 106 can include four outer portions 106b (e.g., arms) that are spaced apart from each other as they extend away from the central portion 106a. In other embodiments, the airframe 106 can include other numbers of outer portions 106b. In any of these embodiments, individual outer portions 106b can support one or more components of a propulsion system that drives the UAV 100. For example, individual arms can support corresponding individual motors 101a that drive corresponding propellers 105. The UAV controller 102 is configured to control the UAV 100. In some embodiments, the UAV controller 102 can include a processor coupled and configured to control the other components of the UAV 100. In some embodiments, the UAV controller 102 can be coupled to a storage component that is configured to, permanently or temporarily, store information associated with or generated by the UAV 100. In particular embodiments, the storage component can include a disk drive, a hard disk, a flash drive, a memory, or the like. As shown in FIG. 1A, the UAV 100 can also include a hollow motor assembly 101b configured to rotate a rotatable lens/prism of a range finding device/component (or a range scanning device or a Lidar system). In some embodiments, the hollow motor assembly 101b can be carried by a vehicle (e.g., a self-driving car).

FIG. 1B is an isometric view illustrating components of a hollow motor assembly 101 configured in accordance with representative embodiments of the present technology. As shown in FIG. 1B, the hollow motor assembly 101 includes a rotor assembly 107, a stator assembly 108, and a positioning component (e.g., a bearing assembly) 109. In some embodiments, the rotor assembly 107 includes a magnet 107a and a magnet yoke 107b coupled to the magnet 107a. The rotor assembly 107 is positioned/configured to rotate about a rotation axis R. The rotor assembly 107 includes an inner surface 116 that circumferentially faces or bounds an opening or an interior chamber 117. As noted in FIG. 1B, a radial direction and an angular direction can be defined at least partially based on the rotation axis R.

The stator assembly 108 can include a first stator portion 108a and a second stator portion 108b positioned opposite to the first stator portion 108a. The stator assembly 108 is not rotatable and is fixedly attached to other components of the UAV 100 (e.g., a housing). When an electrical current passes through a winding component (discussed in further detail below with reference to FIG. 6E) of the stator assembly 108, a magnetic field is formed, which moves the magnet 107a. By controlling the electrical current and the generated magnetic field, the rotor assembly 107 can be rotated at various rotational speeds. In some embodiments, the stator assembly 108 can have any number of stator portions (such as illustrated in FIG. 1B), or can have a full annular structure (such as discussed elsewhere herein).

The bearing assembly 109 is positioned adjacent to the rotor assembly 107 and configured to maintain the (radial) location of the rotor assembly 107 relative to the stator assembly 108. In the illustrated embodiments, the bearing assembly 109 includes a bearing that can rotate about a rotation axis A. Because the bearing assembly 109 can rotate relative to the rotor assembly 107, it can effectively position the rotor assembly 107 without unduly interfering with the rotation of the rotor assembly 107. In the illustrated embodiment, the hollow motor assembly 101 further includes a guide rail (or protrusion) 115 positioned adjacent to or as a part of the rotor assembly 107. In the illustrated embodiment, the guide rail 115 is positioned to facilitate maintaining the location of the bearing assembly 109 relative to the rotor assembly 107. In other embodiments, the guide rail 115 can implemented as a protrusion extending from the bearing assembly 109. In some embodiments, the guide rail 115 can also facilitate maintaining the location of the bearing assembly 109 relative to the stator assembly 108.

Figure 1C:
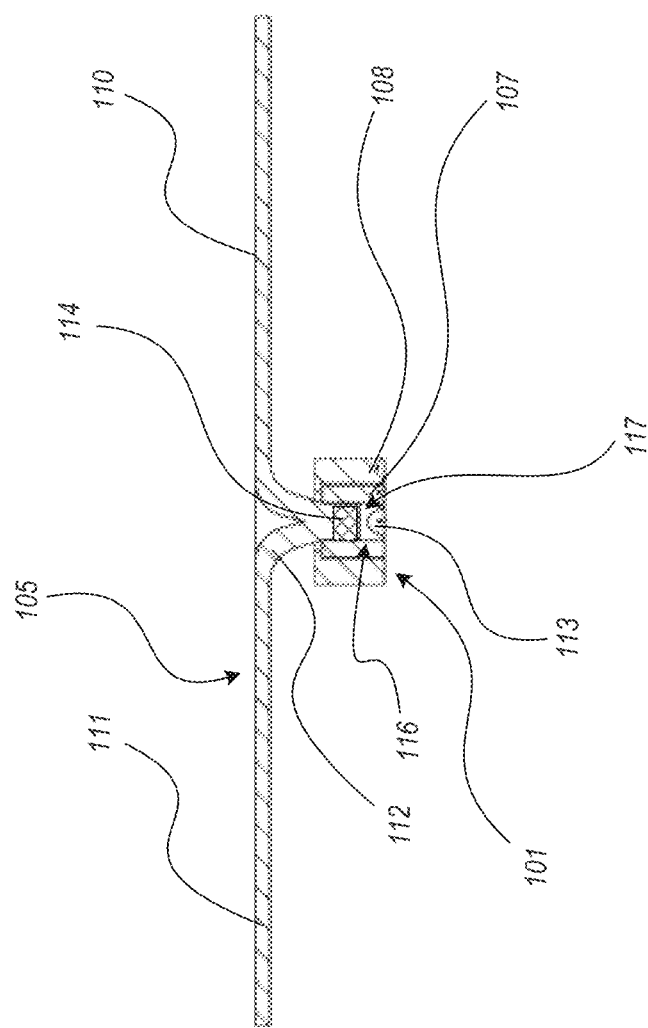
FIG. 1C is a partially schematic cross-sectional view illustrating a propeller and a hollow motor assembly configured in accordance with representative embodiments of the present technology.

FIG. 1C is a partially schematic cross-sectional view illustrating a propeller 105 and a hollow motor assembly 101 configured in accordance with representative embodiments of the present technology. The propeller 105 includes a first blade 110, a second blade 111 opposite to the first blade 110, and a hub 112. When the propeller 105 is rotating, the outer edges of the first/second blades 110, 111 can together define a rotational disk. The hollow motor assembly 101 includes a rotor assembly 107 and a stator assembly 108 positioned external to the rotor assembly 107. In this arrangement, the hollow motor assembly 101 is referred to as an "inner-rotor" motor. In other embodiments, however, the hollow motor assembly 101 can be an "outer-rotor" motor (as discussed below with reference to FIG. 5E). In some embodiments, the stator assembly 108 can be fixedly attached to other components (e.g., a housing) of the UAV 100. The rotor assembly 107 can rotate relative to the stator assembly 108. As shown, the rotor assembly 107 has an inner surface 116 that circumferentially faces or bounds an interior chamber (or interior space) 117. The interior chamber 117 is at least partially defined by the inner surface 116 of the rotor assembly 107. The interior chamber 117 can be used to accommodate one or more rotatable or non-rotatable components.

As shown in FIG. 1C, an optical component, a transparent component or other suitable component 114 can be positioned in the interior chamber 117 and coupled to the rotor assembly 107. When the rotor assembly 107 rotates, the optical component 114 can rotate with the rotor assembly 107. In some embodiments, the optical component 114 can include a lens, a prism, or a combination thereof. In the illustrated embodiment of FIG. 1C, a light source 113 is positioned in the interior chamber 117 and coupled to a non-rotatable component (e.g., a housing or the stator component 108 of the UAV 100). The light source 113 is configured to emit light rays to the propeller 105 through the optical component 114. The optical component 114 can change the direction of the light rays and then further direct them to the propeller 105. The light rays can then be emitted out of the propeller 105 to form a visual indication or signal that can convey information (e.g., a status of the UAV 100) to an operator or a bystander. In some embodiments, the optical component 114 can change a parameter of the light rays. For example, the optical component 114 can include a color filter that can change the color of the incoming light rays. In some embodiments, the light source 113 can be non-rotatable (as discussed above) and in other embodiments, the light source 113 can be rotatable (e.g., can be coupled to the rotor assembly 107).

Figure 1D:
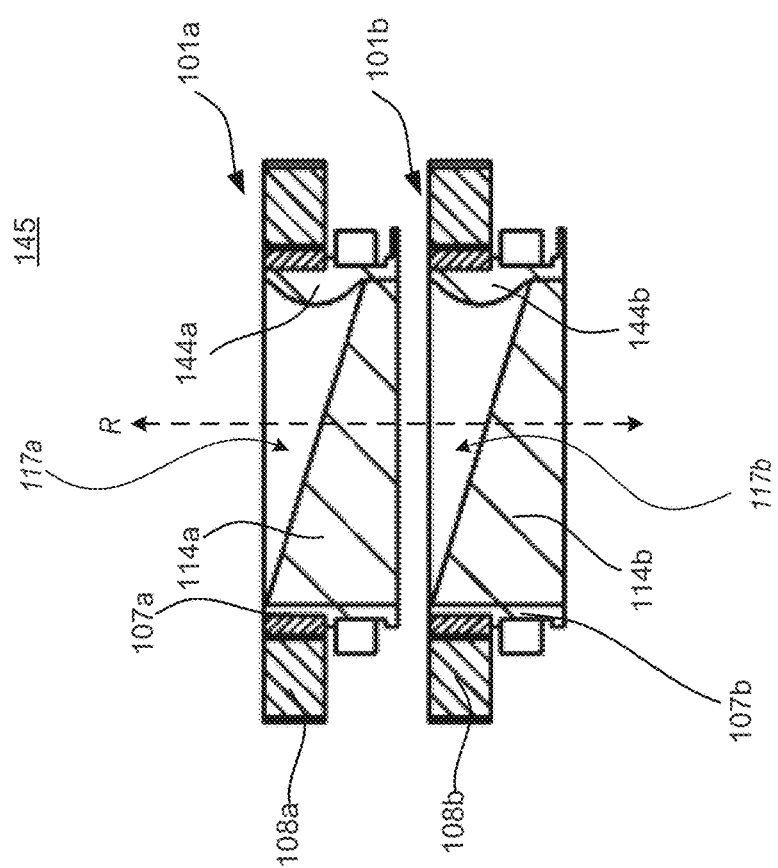
FIG. 1D is a partially schematic cross-sectional view illustrating two hollow motor assemblies in a Lidar system configured in accordance with representative embodiments of the present technology.

In some embodiments, the hollow motor assembly 101 can be used in a range finding/scanning system (or a Lidar system). For example, FIG. 1D is a partially schematic cross-sectional view illustrating first and second hollow motor assemblies 101a, 101b in a Lidar system 145 configured in accordance with representative embodiments of the present technology. The first hollow motor assembly 101a and the second hollow motor assembly 101b are positioned axially adjacent to each other (e.g., along a rotation axis R). The first hollow motor assembly 101a includes a first stator assembly 108a positioned radially external to a first rotor assembly 107a. The second hollow motor assembly 101b includes a second stator assembly 108b positioned radially external to a second rotor assembly 107b. In the illustrated embodiment, the first/second hollow motor assemblies 101*a*, 101*b* are "inner-rotor" type electrical motors. In other embodiments, one (or both) of the first/second hollow motor assemblies 101*a*, 101*b* can be an "outer-rotor" type electrical motor. As shown, the Lidar system 145 includes a Risley prism pair, which further includes a first prism 114*a* and a second prism 114*b*. The first prism 114*a* is positioned in a first opening 117*a* of the first hollow motor assembly 101*a*. The second prism 114*b* is positioned in a second opening 117*b* of the second hollow motor assembly 101*b*. The first prism 114*a* is coupled to and rotates with the first rotor assembly 107*a*. The second prism 114*b* is coupled to and rotates with the second rotor assembly 107*b*. By rotating the first and second prisms 114*a*, 114*b*, the Lidar system 145 can perform various range finding/scanning tasks. Embodiments of rotating multiple optical components are further discussed in detail with reference to FIG. 10.

Figure 2:
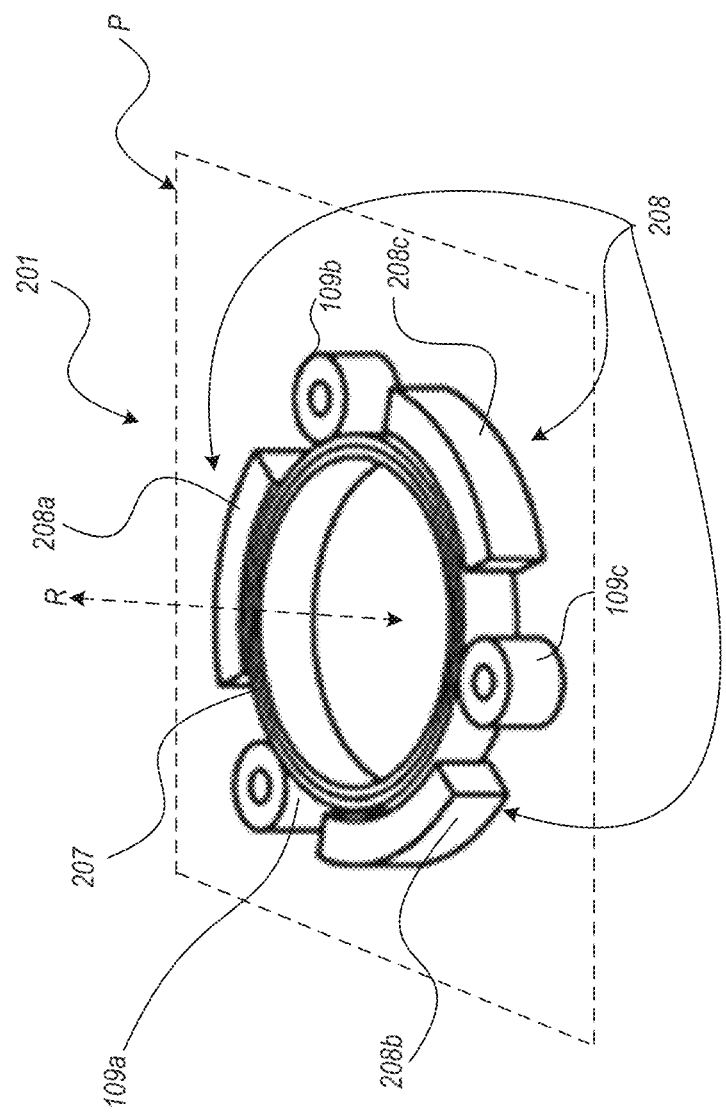
FIG. 2 is an isometric view illustrating components of a hollow motor assembly configured in accordance with representative embodiments of the present technology.

FIG. 2 is an isometric view illustrating components of a hollow motor assembly 201 configured in accordance with representative embodiments of the present technology. As shown, the hollow motor assembly 201 includes a rotor assembly 207 having an annular structure. The rotor assembly 207 is positioned to rotate about a rotation axis R. The hollow motor assembly 201 also includes a stator assembly 208 positioned external to the rotor assembly 207. As shown, the stator assembly 208 includes three stator portions 208*a*, 208*b*, and 208*c*. The stator assembly 208 remains stationary as the rotor assembly 207 rotates. The hollow motor assembly 201 includes three bearing assemblies 109*a*, 109*b*, and 109*c*. In the illustrated embodiment, the stator portions 208*a*, 208*b*, and 208*c* and the bearing assemblies 109*a*, 109*b*, and 109*c* are positioned along a circumference C (of the rotor assembly 207) in a plane P that is generally perpendicular to the rotation axis R. In FIG. 2, each of the bearing assemblies 109*a-c* is positioned between two of the stator portions 208*a-c*. In some embodiments, the hollow motor assembly 201 can include different numbers of bearing assemblies and stator portions than illustrated.

Figure 3B:
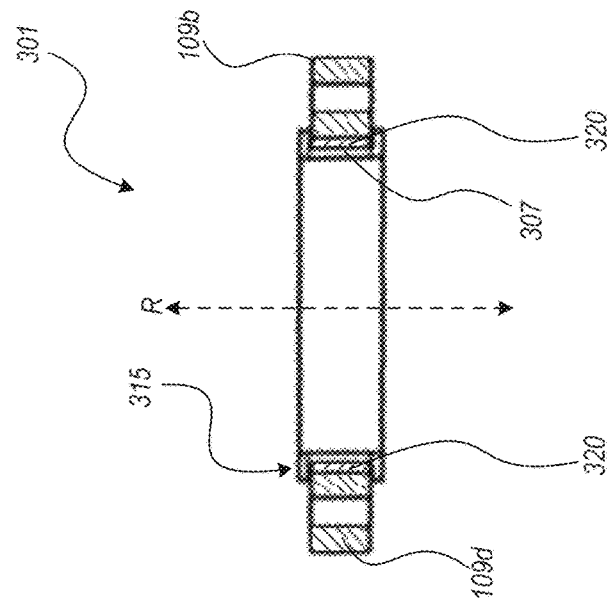
FIG. 3B is a cross-sectional view taken along line A-A of FIG. 3A illustrating components of a hollow motor assembly configured in accordance with representative embodiments of the present technology.
Figure 3A:
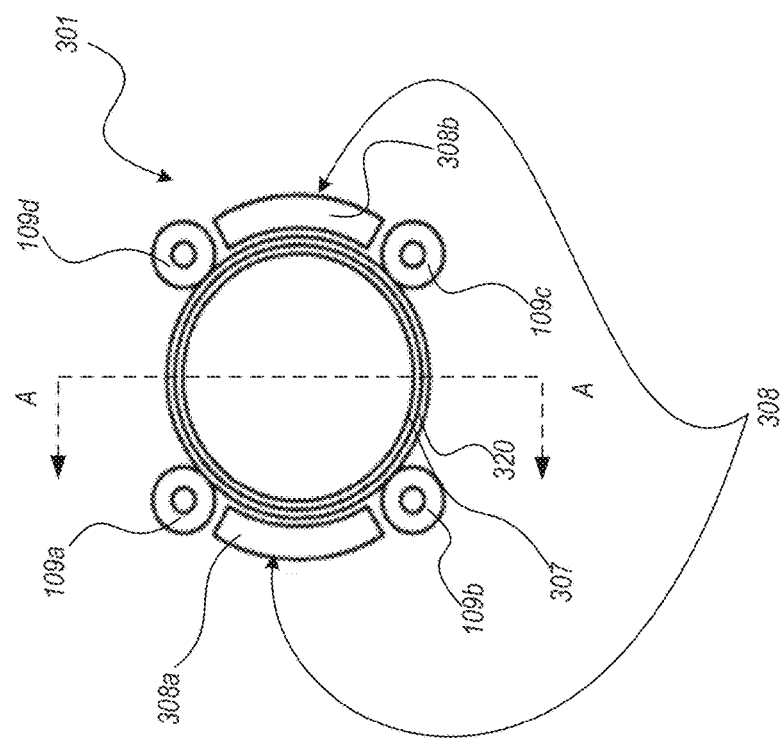
FIG. 3A is a cross sectional view illustrating components of a hollow motor assembly configured in accordance with representative embodiments of the present technology.

FIG. 3A is a cross sectional view illustrating components of a hollow motor assembly 301 configured in accordance with representative embodiments of the present technology. FIG. 3B is a cross-sectional view along line A-A of FIG. 3A illustrating components of the hollow motor assembly 301. As shown, the hollow motor assembly 301 includes a rotor assembly 307 having an annular structure (and an annular magnet 320). The rotor assembly 307 is positioned to rotate about a rotation axis R. The hollow motor assembly 301 includes a stator assembly 308 positioned radially external to the rotor assembly 307. As shown, the stator assembly 308 includes two stator portions 308*a* and 308*b* positioned opposite to each other. The stator assembly 208 remains stationary when the rotor assembly 307 rotates. The hollow motor assembly 301 includes four bearing assemblies 109*a*, 109*b*, 109*c*, and 109*d*. In the illustrated embodiment, the stator portions 308*a* and 308*b* and the bearing assemblies 109*a*, 109*b*, 109*c*, and 109*d* are positioned around a circumference of the rotor assembly 307 in a plane that is generally perpendicular to the rotation axis R. As shown in FIG. 3A, each of the stator portions 208*a*, 208*b* is positioned between two of the positioning components 109*a-d*. In other embodiments, the hollow motor assembly 301 can include different numbers of bearing assemblies and stator portions.

As shown in FIG. 3B, the hollow motor assembly 301 includes a guide rail (or protrusion) 315 extending radially outwardly from the rotor assembly 307. The guide rail 315 is positioned to facilitate maintaining the location (e.g., the axial location) of the bearing assemblies 109*a-d* relative to the rotor assembly 107.

Figure 4B:
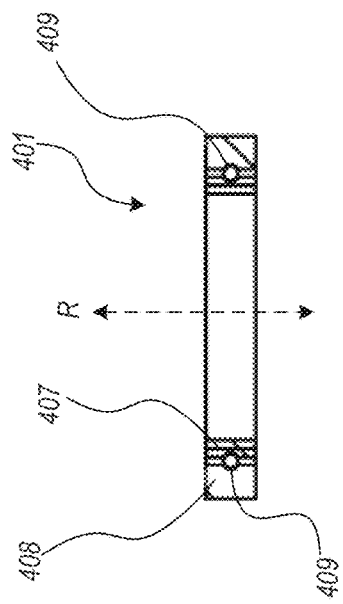
FIG. 4B is a cross-sectional view taken along line B-B of FIG. 4A illustrating components of a hollow motor assembly configured in accordance with representative embodiments of the present technology.
Figure 4C:
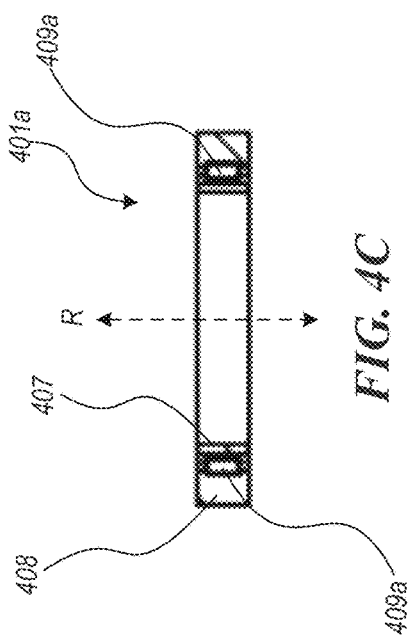
FIG. 4C is a cross-sectional view taken along line B-B of FIG. 4A illustrating components of another hollow motor assembly configured in accordance with representative embodiments of the present technology.
Figure 4A:
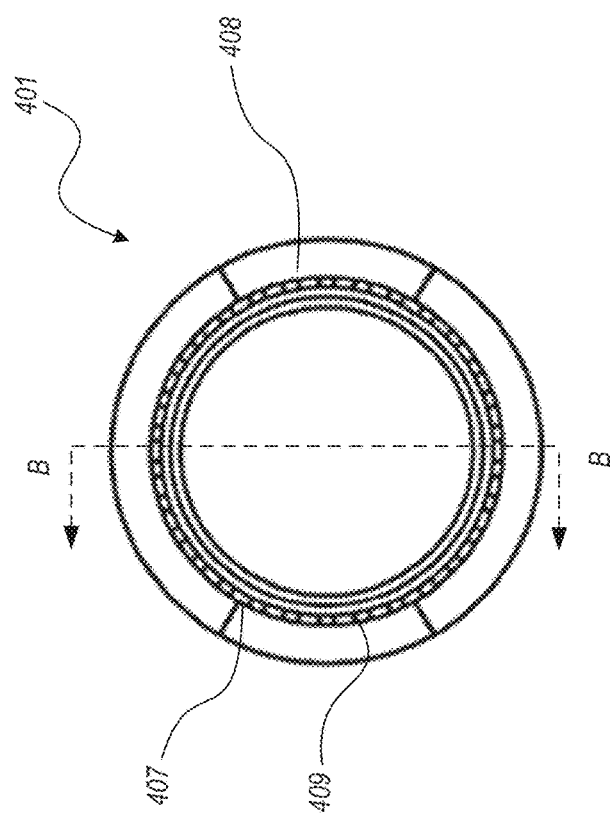
FIG. 4A is a top view illustrating components of a hollow motor assembly configured in accordance with representative embodiments of the present technology.

FIG. 4A is a top view illustrating components of a hollow motor 401 assembly configured in accordance with representative embodiments of the present technology. FIG. 4B is a cross-sectional view along line B-B of FIG. 4A illustrating components of the hollow motor assembly 401. As shown, the hollow motor assembly 401 includes a rotor assembly 407, a stator assembly 408, and a positioning component 409 positioned between the rotor assembly 407 and the stator assembly 408. The rotor assembly 407 is positioned to rotate about a rotation axis R. The stator assembly 408 is positioned external to the rotor assembly 407 and does not rotate. As shown, the rotor assembly 407 is positioned adjacent to but is rotatable relative to the stator assembly 408. In the illustrated embodiments shown in FIGS. 4A and 4B, the positioning component 409 includes multiple rolling balls positioned around a circumference of the rotor assembly 407 in a plane generally perpendicular to the rotation axis R. The positioning component 409 is positioned in the integral housing that is formed by the rotor assembly 407 and the stator assembly 408. As shown, both the rotor assembly 407 and the stator assembly 408 have an annular structure. In some embodiments, the positioning component 409 can include an annular structure.

FIG. 4C is a cross-sectional view along line B-B of FIG. 4A illustrating another embodiment of the hollow motor assembly 401*a*. In this embodiment, the hollow motor assembly 401*a* includes a positioning component 409*a* which further includes multiple rolling pins positioned around a circumference of the rotor assembly 407 in a plane generally perpendicular to the rotation axis R.

Figure 4D:
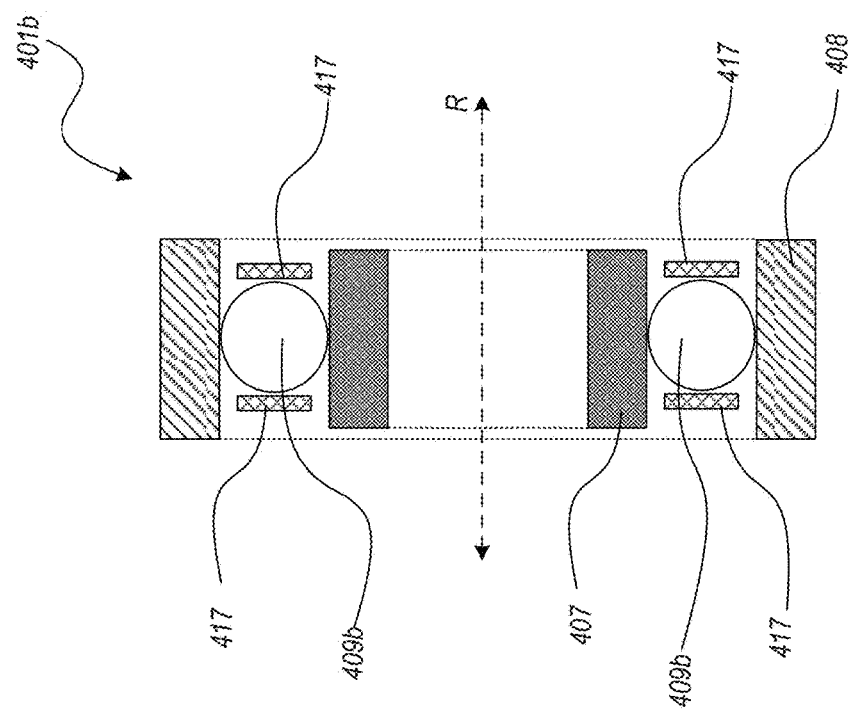
FIG. 4D is an isometric, schematic view illustrating components of a hollow motor assembly configured in accordance with representative embodiments of the present technology.

FIG. 4D is an isometric, schematic view illustrating components of a hollow motor assembly 401*b* configured in accordance with representative embodiments of the present technology. The hollow motor assembly 401*b* includes a rotor assembly 407 and a stator assembly 408 positioned external to the rotor assembly 407. The rotor assembly 407 is positioned to rotate about a rotation axis R relative to the stator assembly 408 (which does not rotate). In this embodiment, the hollow motor assembly 401*b* includes a positioning component 409*b* which further includes multiple rolling balls. As shown, each of the rolling balls is positioned in a space defined by a support component 417 positioned between the rotor assembly 407 and the stator assembly 408. The support component 417 is configured to maintain the location of the positioning component 409*b* relative to the stator assembly 408 and/or the rotor assembly 407.

Figure 5A:
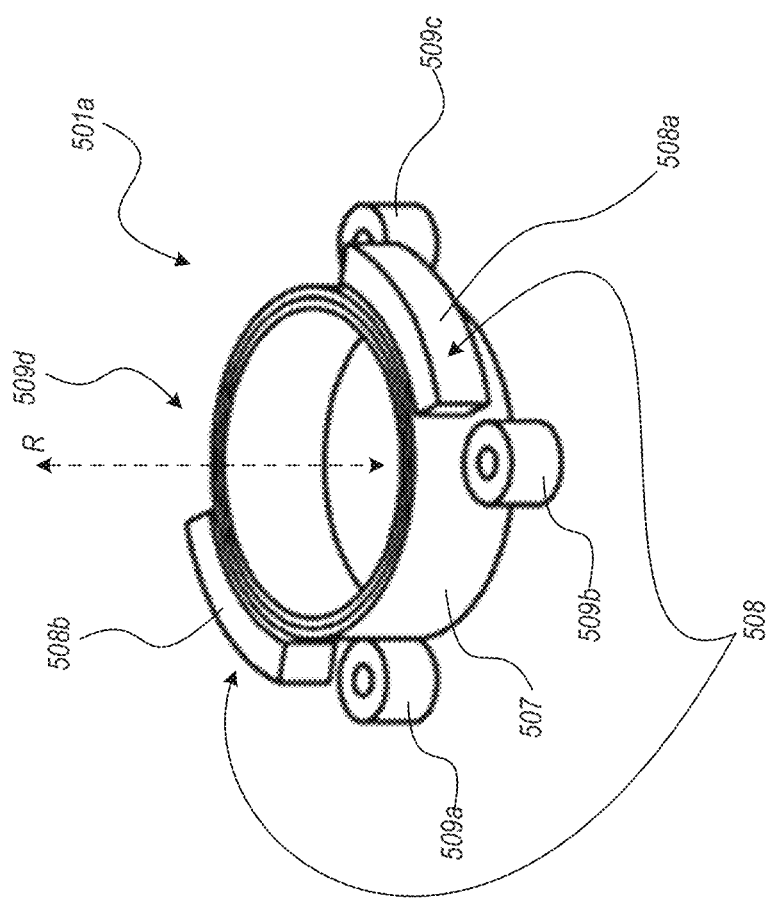
FIG. 5A is an isometric view illustrating components of a hollow motor assembly configured in accordance with representative embodiments of the present technology.

FIG. 5A is an isometric view illustrating components of a hollow motor assembly 501*a* configured in accordance with representative embodiments of the present technology. As shown, the hollow motor assembly 501*a* includes a rotor assembly 507 having an annular structure. The rotor assembly 507 is positioned to rotate about a rotation axis R. The hollow motor assembly 501*a* includes a stator assembly 508 positioned external to the rotor assembly 507. As shown, the stator assembly 508 includes two stator portions 508*a* and 508*b* positioned opposite to each other. The stator assembly 508 remains stationary when the rotor assembly 507 rotates. The hollow motor assembly 501*a* includes four bearing assemblies 509*a*, 509*b*, 509*c*, and 509*d* (note that the bearing assembly 509*d* is not visible in FIG. 5A). In the illustrated embodiment, the stator portions 508*a* and 508*b* are positioned along a circumference of the rotor assembly 507 in a plane that is generally perpendicular to the rotation axis R. The bearing assemblies 509*a*, 509*b*, 509*c*, and 509*d* are positioned along another circumference of the rotor assembly 507 in another plane that is generally perpendicular to the rotation axis R. In other embodiments, the hollow motor assembly 501a can include different numbers of bearing assemblies and/or stator portions than are shown in FIG. 5A. In some embodiments, at least one of the stator portions 508a and 508b can be positioned axially in alignment with a least one of the bearing assemblies 509a-d. In other embodiments, none of the stator portions 508a and 508b is positioned axially in alignment with any one of the bearing assemblies 509a-d.

Figure 5B:
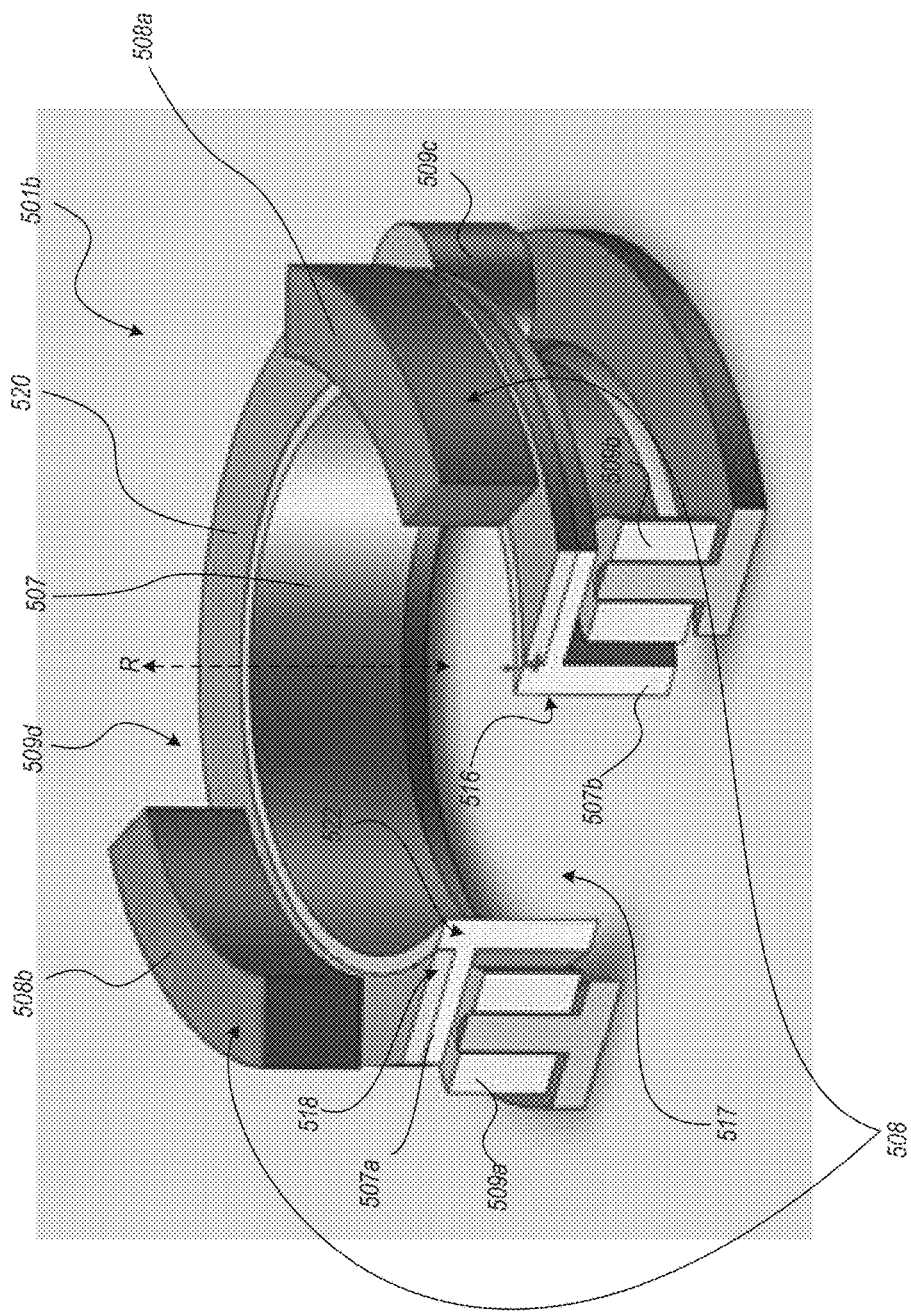
FIG. 5B is an isometric view illustrating components of a hollow motor assembly configured in accordance with representative embodiments of the present technology.

FIG. 5B is an isometric view illustrating components of a hollow motor assembly 501b configured in accordance with representative embodiments of the present technology. As shown, the hollow motor assembly 501b includes a rotor assembly 507 positioned to rotate about a rotation axis R. As shown, the rotor assembly 507 includes a magnet 520 and a magnet yoke 522. The magnet yoke 522 includes an outer portion 507a and an inner portion 507b. The inner portion 507b includes an inner surface 516 that circumferentially faces or bounds an interior chamber (or interior space) 517. The interior chamber or space 517 can be used to accommodate an optical component (e.g., a lens, a prism, and/or other suitable devices) and/or a light source. The outer portion 507a is formed with a recess 518 configured to accommodate the magnet 520 which has a flat structure. In some embodiments, the inner portion 507b is positioned generally parallel to the rotation axis R, and the outer portion 507a is portioned generally perpendicular to the rotation axis R.

As shown in FIG. 5B, the hollow motor assembly 501b includes a stator assembly 508 positioned external to at least a portion (e.g., the inner portion 507b) of the rotor assembly 507. As shown, the stator assembly 508 includes two stator portions 508a and 508b positioned opposite to each other. The stator assembly 508 remains stationary as the rotor assembly 507 rotates. The hollow motor assembly 501b includes four bearing assemblies 509a, 509b, 509c, and 509d (note that the bearing assembly 509d is not visible in FIG. 5B). In the illustrated embodiment, the stator portions 508a and 508b are positioned along a first circumference of the rotor assembly 507 in a plane that is generally perpendicular to the rotation axis R. The bearing assemblies 509a, 509b, 509c, and 509d are positioned along a second circumference of the rotor assembly 507 in another plane that is generally perpendicular to the rotation axis R. In some embodiments, the radius of the first circumference can be generally the same as the radius of the second circumference.

Figure 5C:
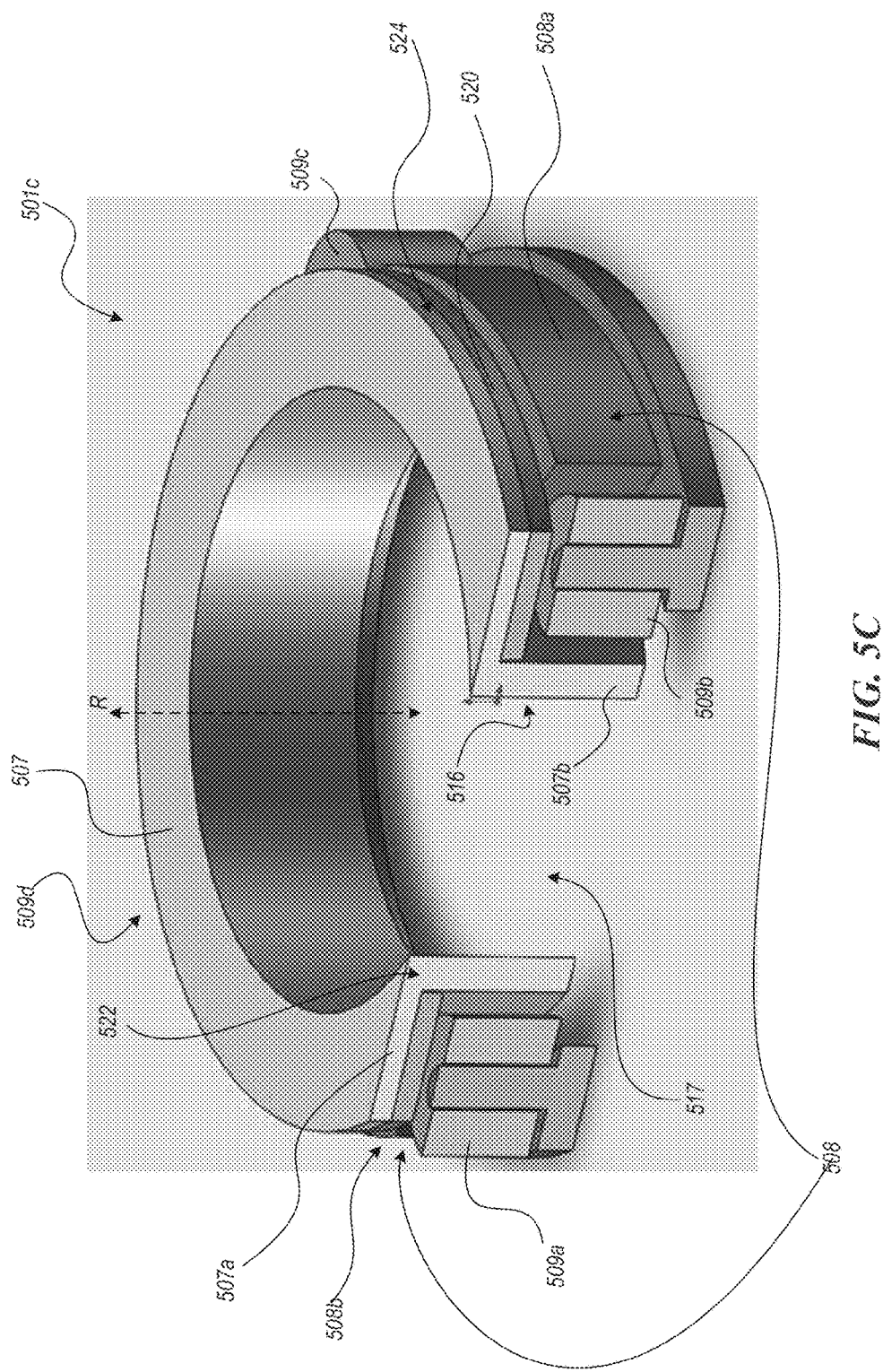
FIG. 5C is an isometric view illustrating components of another hollow motor assembly configured in accordance with representative embodiments of the present technology.

FIG. 5C is an isometric view illustrating components of a hollow motor assembly 501c configured in accordance with representative embodiments of the present technology. The hollow motor assembly 501c includes a rotor assembly 507 positioned to rotate about a rotation axis R. As shown, the rotor assembly 507 includes a magnet 520 and a magnet yoke 522. The magnet yoke 522 includes an outer portion 507a and an inner portion 507b. The inner portion 507b includes an inner surface 516 circumferentially faces or bounds an interior chamber 517, which can be used to accommodate a rotatable component (e.g., coupled to the rotor assembly 507) or non-rotatable component (e.g., coupled to a non-rotatable component such as a housing or a chassis). As shown, the outer portion 507a is formed in flush with the magnet 520 such that the rotor assembly 507 has a smooth outer surface 524. In the illustrated embodiment, the magnet 520 is axially positioned between the stator assembly 508 and the outer portion 507a of the stator assembly 507. In other embodiments, the magnet 520 can be radially positioned between the stator assembly 508 and the inner portion 507b of the stator assembly 507.

As shown in FIG. 5C, the hollow motor assembly 501c includes a stator assembly 508 positioned external to at least a portion (e.g., the inner portion 507b) of the rotor assembly 507. As shown, the stator assembly 508 includes two stator portions 508a and 508b positioned opposite each other. The stator assembly 508 remains stationary as the rotor assembly 507 rotates. The hollow motor assembly 501c includes four bearing assemblies 509a, 509b, 509c, and 509d (note that the bearing assembly 509d is not visible in FIG. 5B). In the illustrated embodiment, the stator portions 508a and 508b and the bearing assemblies 509a, 509b, 509c, and 509d are positioned along a circumference of the rotor assembly 507 in a plane that is generally perpendicular to the rotation axis R.

FIG. 5D includes an end view illustrating components of a hollow motor assembly 501d configured in accordance with representative embodiments of the present technology. The hollow motor assembly 501d includes a rotor assembly 507 positioned to rotate about a rotation axis R (e.g., extending perpendicular to the plane in which FIG. 5D is located). The stator assembly 508 remains stationary as the rotor assembly 507 rotates. As shown, the rotor assembly 507 includes an annular structure. The hollow motor assembly 501d includes a stator assembly 508 positioned external to the rotor assembly 507. As shown, the stator assembly 508 includes two sector-stator portions (or arcuate-stator portions) 519a and 519b positioned opposite each other. Each of the sector-stator portions 519a-b includes a stator core portion 526, a winding portion (or winding protrusion) 528 extending form the stator core portion 526, and a connecting component 530 configured to be coupled to a chassis 523 of the hollow motor assembly 501d. The chassis 523 can be further coupled to other components (e.g., a housing) of the hollow motor assembly 501d. The winding portions 528 can be used to position a wire winding component thereon (e.g., by wrapping a wire on the winding portion 528). In some embodiments, the hollow motor assembly 501d can include multiple bearing assemblies (not shown in FIG. 5D) positioned to maintain the location of the rotor assembly 507 relative to the stator assembly 508.

Figure 5E:
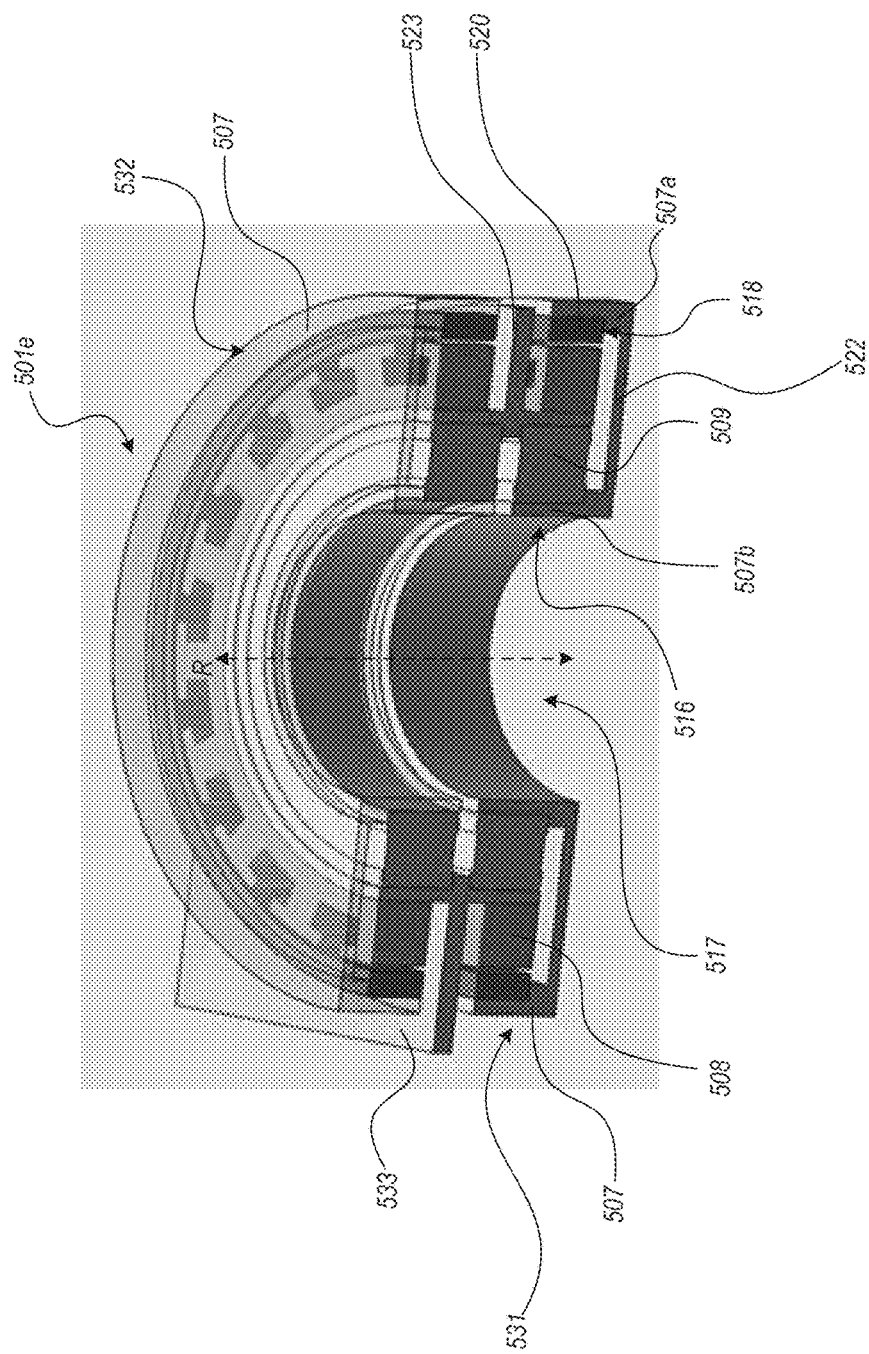
FIG. 5E is an isometric view illustrating components of a hollow motor assembly configured in accordance with representative embodiments of the present technology.

FIG. 5E is an isometric view illustrating components of a hollow motor assembly 501e configured in accordance with representative embodiments of the present technology. The hollow motor assembly 501e includes a first (or lower) rotor/stator set 531, a second (or upper) rotor/stator set 532, and a chassis 533 positioned to couple the first rotor/stator set 531 to the second rotor/stator set 532. The first and second rotor/stator sets 531, 532 have similar structures and are positioned on opposite sides of the chassis 533. In other embodiments, the first and second rotor/stator sets 531, 532 can be coupled by other suitable structures or means.

As shown in FIG. 5E, each of the first rotor/stator sets 531, 532 includes a rotor assembly 507 positioned to rotate about a rotation axis R. As shown, the rotor assembly 507 includes a magnet 520 and a magnet yoke 522 coupled to the magnet 520. The magnet yoke 522 includes an outer portion 507a and an inner portion 507b. The inner portion 507b includes an inner surface 516 that circumferentially faces or bounds the interior chamber 517. As shown, the outer portion 507a is formed with a recess 518 configured to accommodate the magnet 520 which has a flat structure.

As shown in FIG. 5E, each of the first rotor/stator sets 531, 532 includes a stator assembly 508 positioned external to at least a portion (e.g., the inner portion 507b) of the rotor assembly 507. As shown, the stator assembly 508 includes an annular structure. Embodiments of the annular stator assembly are discussed in further detail below with reference to FIGS. 6A-6C. Each of the first rotor/stator sets 531, 532 includes an "annular" bearing assembly 509 (e.g., a set of bearings, rolling balls, rolling pins, and/or other suitable rolling components) that are annularly positioned to maintain the location of the rotor assembly 507 relative to the stator assembly 508. The hollow motor assembly 501e can be described as an "outer-rotor" type because the magnet 520 is positioned external to the stator assembly 508, even though a portion (e.g., the inner portion 507b) of the rotor assembly 507 is positioned internal to the stator assembly 508.

As shown in FIG. 5E, the magnet yoke 522 (e.g., as an integral part of the rotor assembly 507) has a structure that can generally cover the magnet 520, the stator assembly 508, and the bearing assembly 509 (e.g., the structure generally covers the top side, the inner side, and the outer side of these components). In such embodiments, the magnet yoke 522 can function as a housing to protect the magnet 520, the stator assembly 508, and the bearing assembly 509. In some embodiments, the magnet yoke 522 can have different structures (e.g., it can cover a portion of other sides of these components).

The first/second rotor/stator sets 531, 532 can be separately controlled such that the rotor assemblies 507 of the first/second rotor/stator sets 531, 532 can rotate at different rotational speeds. In some embodiments, the rotor assembly 507 of the first rotor/stator set 531 can be coupled to a first optical component (e.g., a first lens or prism), and the rotor assembly 507 of the second rotor/stator set 532 can be coupled to a second optical component (e.g., a second lens or prism). The hollow motor assembly 501e can further include a light source positioned therein. By separately controlling the rotor assemblies 507 of the first and second rotor/stator sets 531, 532 (e.g., at different rotational speeds and/or directions, to different angles), the hollow motor assembly 501e can precisely control the light rays emitted from the light source that pass through the first/second optical components (e.g., passing through an interior chamber 517 inside the hollow motor assembly 501e). Embodiments of techniques and devices for controlling the emitted light rays are discussed below with reference to FIGS. 9A-10.

Figure 5F:
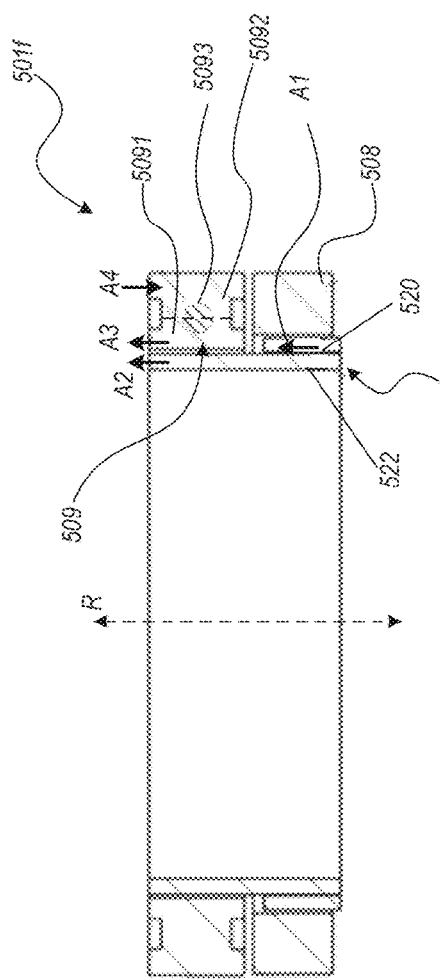
FIGS. 5F, 5G and 5H are schematic diagrams illustrating methods for pre-positioning or pre-tightening in accordance with representative embodiments of the present technology.
Figure 5G:
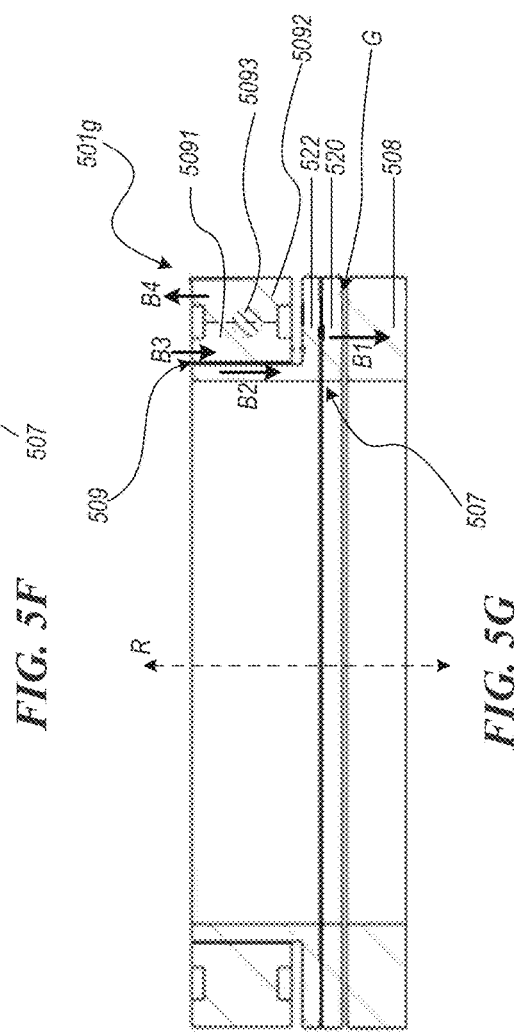
Figure 5H:
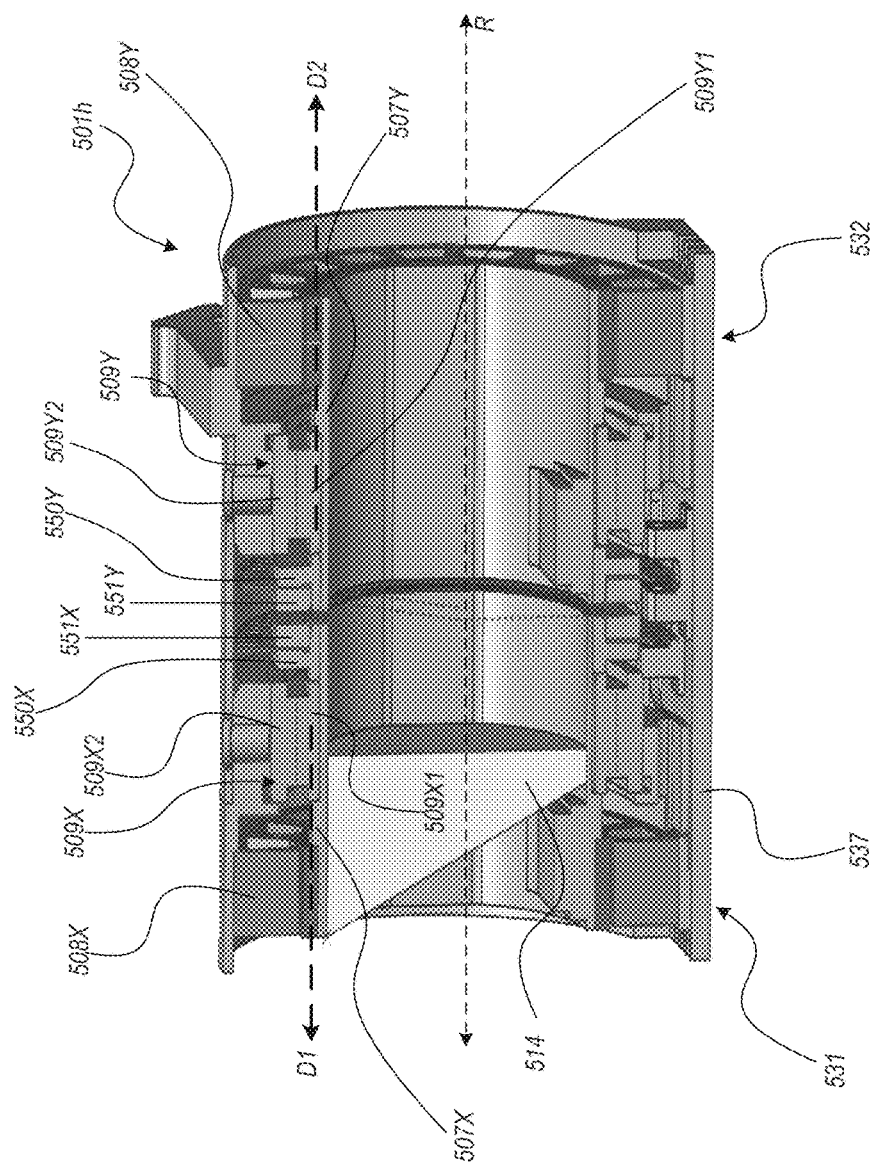

FIGS. 5F, 5G and 5H are schematic diagrams illustrating methods for "pre-positioning" or "pre-tightening" in accordance with representative embodiments of the present technology. The methods for "pre-positioning" or "pre-tightening" are further discussed in detail below with reference to FIG. 14. In FIGS. 5F and 5G, hollow motor assemblies 501f, 501g each include a rotor assembly 507 positioned to rotate about a rotation axis R, a stator assembly 508 positioned external to the rotor assembly 507, and a bearing assembly 509 positioned to maintain the location of the rotor assembly 507 relative to the stator assembly 508. The rotor assembly 507 includes a magnet 520 and a magnet yoke 522 coupled to the magnet 520. The bearing assembly 509 further includes (1) an inner portion 5091 (closer to the rotation axis R) coupled to and configured to rotate with the rotor assembly 507; (2) an outer portion 5092 (farther away from the rotation axis R) positioned radially external to the inner portion 5091; and (3) a rolling component 5093 rotatably positioned between the inner portion 5091 and the outer portion 5092. In some embodiments, the inner portion 5091 and/or the outer portion 5092 may be annular or partially annular in shape.

When the bearing assembly 509 is manufactured and before it is installed, bearing clearance is typically provided such that components of the bearing assembly (e.g., the rolling component 5093) can move axially (e.g., with axial clearance) and/or radially (e.g., with radial clearance). However, such clearance can cause movement of the bearing assembly during operation, which in turn can lead to noise, vibration, heat, and other undesirable effects. Such effects can be mitigated by a "pre-positioning" or "pre-tightening" process, in which such bearing clearance can be reduced by causing opposing forces to act upon the bearing assembly.

In FIG. 5F, the magnet 520 is positioned along a direction generally parallel to the rotation axis R. When an electrical current flows in the stator assembly 508, a magnetic force is created between the magnet 520 and the stator component 508. The magnetic force can move the magnet 520 toward alignment with the stator component 508 (e.g., as indicated by arrow A1 in FIG. 5F, an edge of the magnet 520 is generally or substantially flush with an edge of the stator assembly 508). When the magnet 520 is moved, the coupled magnet yoke 522 is also moved in the same direction (e.g., as indicated by arrow A2 in FIG. 5F). The magnet yoke 522 is coupled to the inner portion 5091. Accordingly, when the magnet yoke 522 is moved, the inner portion 5091 is also moved (e.g., as indicated by arrow A3 in FIG. 5F). In some embodiments, the inner portion 5091 may be coupled with and hence move with the magnet yoke 522, while the outer portion 5092 may not move with the magnet yoke 522 (e.g., the outer portion 5092 may be fixedly coupled to the housing or a similar structure). Thus, when the inner portion 5091 is moved relative to the outer portion 5092, opposing forces A3 and A4 act upon the bearing assembly 509 along the axial direction, thereby reducing an internal axial clearance of the rolling component 5093. In other words, the relative movement between the inner portion 5091 and the outer portion 5092 can facilitate positioning the rolling component 5093 at its proper working location (e.g., to reduce an axial clearance of the bearing assembly 509). Accordingly, the rolling component 5093 can be better positioned between the inner portion 5091 and the outer portion 5092, which can effectively reduce noise or vibration.

In FIG. 5G, the magnet 520 is positioned between the stator assembly 508 and the bearing assembly 509, but can still be used to orient the bearing assembly 509. When an electrical current flows in the stator assembly 508, it creates a magnetic force between the magnet 520 and the stator component 508 that can move the magnet 520 toward the stator component 508 (e.g., as indicated by arrow B1 in FIG. 5G, the size of a gap G between the between the magnet 520 and the stator component 508 is decreased). When the magnet 520 is moved, the coupled magnet yoke 522 is also moved in the same direction (e.g., as indicated by arrow B2 in FIG. 5G). The magnet yoke 522 is coupled to the inner portion 5091.

Accordingly, when the magnet yoke 522 is moved, the inner portion 5091 is also moved (e.g., as indicated by arrow B3 in FIG. 5G). In some embodiments, the inner portion 5091 may be coupled with and hence move with the magnet yoke 522, while the outer portion 5092 may not move with the magnet yoke 522 (e.g., the outer portion 5092 may be fixedly coupled to the housing or a similar structure). Thus, when the inner portion 5091 is moved relative to the outer portion 5092, opposing forces B3 and B4 act upon the bearing assembly 509 along the axial direction, thereby reducing an internal axial clearance of the rolling component 5093. In other words, the relative movement between the inner portion 5091 and the outer portion 5092 can facilitate positioning the rolling component 5093 at its proper working location (e.g., to reduce an axial clearance of the bearing assembly 509). Accordingly, the rolling component 5093 can be better positioned between the inner portion 509l1 and the outer portion 509l2, which can effectively reduce noise or vibration. The "pre-positioning" or "pre-tightening" process described herein can be applied to other types of bearing assemblies (e.g., the positioning component 109).

In some embodiments, the "pre-positioning" or "pre-tightening" process can be done by adding two or more additional magnets to a hollow motor assembly. For example, FIG. 5H illustrates methods for "pre-positioning" or "pre-tightening" by additional magnets in accordance with representative embodiments of the present technology. A hollow motor assembly 501h in FIG. 5H includes first and second rotor/stator sets 531, 532 (e.g., similar to the motor structure discussed in FIG. 5E).

The first rotor/stator set 531 includes a first connecting member 550X configured to couple with a second connecting member 550Y of the second rotor/stator set 532. The first rotor/stator set 531 includes a first rotor assembly 507X coupled to an optical component 514, a first stator assembly 508X positioned radially external to the first rotor assembly 507X, a first bearing assembly 509X positioned to maintain the location of the first rotor assembly 507X relative to the first stator assembly 508X, and a first magnet 551X positioned adjacent to the first connecting member 550X. The second rotor/stator set 532 includes a second rotor assembly 507Y, a second stator assembly 508Y positioned radially external to the second rotor assembly 507Y, a second bearing assembly 509Y positioned to maintain the location of the second rotor assembly 507Y relative to the second stator assembly 508Y, and a second magnet 551Y positioned adjacent to the second connecting member 550Y. In some embodiments, the second rotor/stator set 532 can also couple to an optical component. In the illustrated embodiment in FIG. 5 H, the first and second bearing assemblies 509X, 509Y both have an annular structure.

The first bearing assembly 509X includes an inner portion 509X1 (rotatable; coupled to the first rotor assembly 507X) and an outer portion 509X2 (non-rotatable; coupled to the housing 537). The first bearing assembly 509X can include one or more rolling component (not shown in FIG. 5H) between the outer portion 509X2 and the inner portion 509X1, so as to facilitate the relative rotation between these two components. Similarly, the second bearing assembly 509Y can include an outer portion 509Y2 (non-rotatable; coupled to the housing 537) and an inner portion 509Y1 (rotatable; coupled to the second rotor assembly 507Y).

As shown in FIG. 5H, the first and second magnets 551X, 551Y are configured to generate a repulsive magnetic force. When the first rotor assembly 507X rotates to a location where the first and second magnet 551X, 551Y are axially aligned (as shown in FIG. 5H), the repulsive magnetic force moves the first magnet 551X and the first connecting member 550X in direction D1 and moves the second magnet 551Y and the second connecting member 551Y in opposite direction D2. As a result, the inner portions 509X2, 509Y2 can be moved by the repulsive magnetic force (e.g., via the first and second rotor assemblies 507X, 507Y and the first and second connecting members 550X, 550Y). More particularly, the inner portion 509X1 moves in direction D1, and the inner portion 509Y1 moves in direction D2. Opposing forces (in the directions D1 and D2) act upon the first bearing assembly 509X. Similarly, opposing forces (in the directions D1 and D2) act upon the second bearing assembly 509Y. Accordingly, the first and second bearing assemblies 509X, 509Y can be "pre-positioned" or "pre-tightened" in the ways similar to those described above with reference to FIGS. 5F and 5G. In some embodiments, the "pre-positioning" or "pre-tightening" methods described above with reference to FIG. 5H can be applied to a hollow motor assembly with a single rotor/stator set (e.g., the first rotor/stator set 531). For example, in such embodiments, the first magnet 551X can be attached to the first rotor assembly 507X, and the second magnet 551Y can be attached to housing 537 or a chassis attached to the housing 537. When the first magnet 551X and the second magnet 551Y are positioned to generate a repulsive magnetic force, the bearing assembly 509X can be "pre-positioned" or "pre-tightened" in the ways similar to those described above.

Figure 6A:
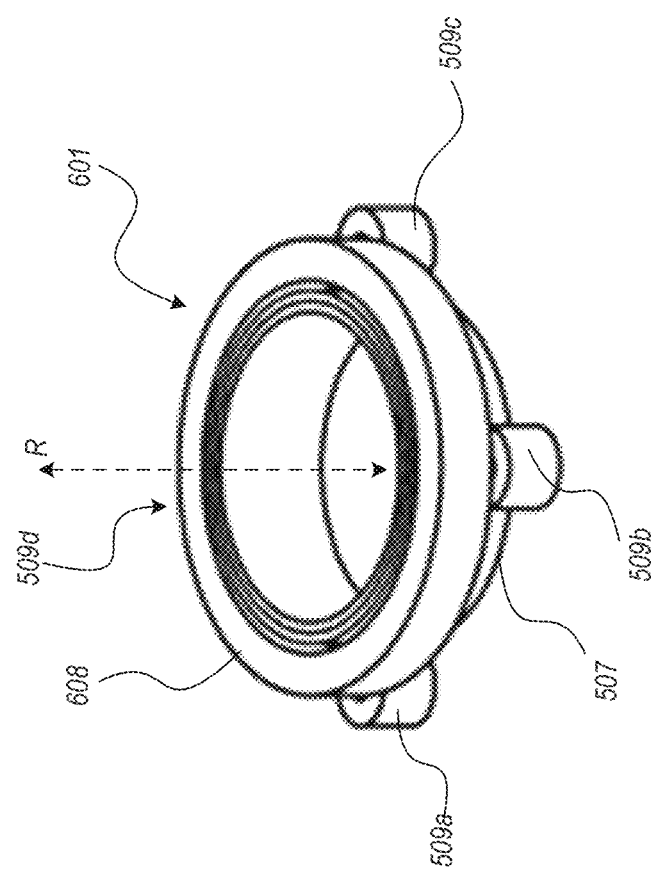
FIG. 6A is an isometric view illustrating components of a hollow motor assembly configured in accordance with representative embodiments of the present technology.

FIG. 6A is an isometric view illustrating components of a hollow motor assembly 601 configured in accordance with representative embodiments of the present technology. The hollow motor assembly 601 includes a rotor assembly 507 having an annular structure. The rotor assembly 507 is positioned to rotate about a rotation axis R. The hollow motor assembly 601 includes an annular stator assembly 608 positioned external to the rotor assembly 507. The annular stator assembly 608 includes a continuous annular structure. The hollow motor assembly 601 includes four bearing assemblies 509a, 509b, 509c, and 509d (note that the bearing assembly 509d is not visible in FIG. 6A). In the illustrated embodiment, the stator assembly 608 is positioned along a first circumference of the rotor assembly 507 in a plane that is generally perpendicular to the rotation axis R. The bearing assemblies 509a, 509b, 509c, and 509d are positioned along a second circumference of the rotor assembly 507 in another plane that is generally perpendicular to the rotation axis R. In the illustrated embodiment in FIG. 6A, the radius of the first circumference is generally the same as the radius of the second circumference. In some embodiments, the hollow motor assembly 601 can have a positioning assembly having an annular structure.

Figure 6C:
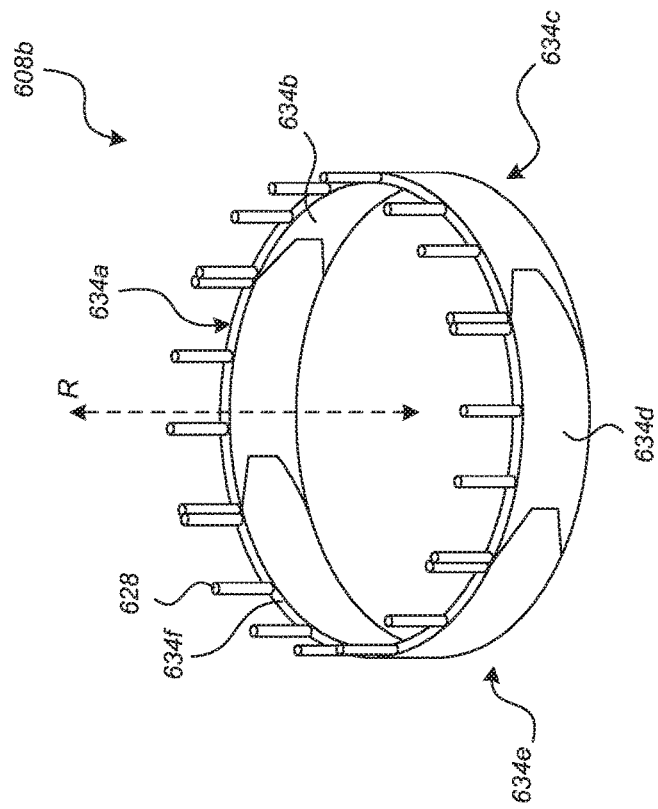
FIG. 6C is an isometric view illustrating another stator assembly configured in accordance with representative embodiments of the present technology.
Figure 6B:
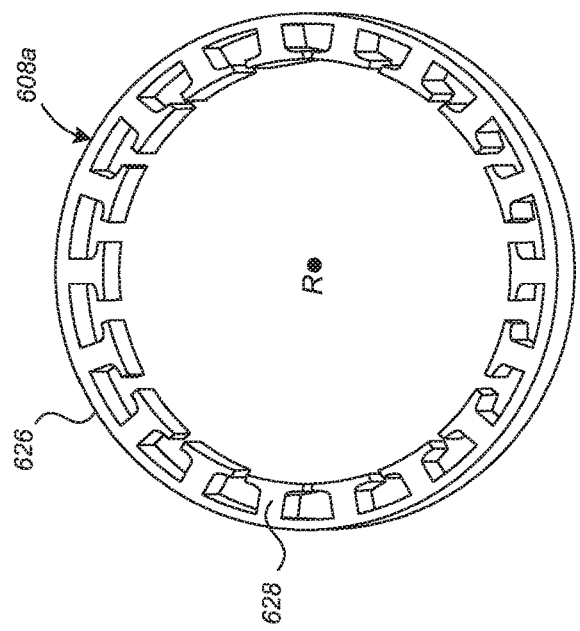
FIG. 6B is an isometric view illustrating a stator assembly configured in accordance with representative embodiments of the present technology.

FIGS. 6B and 6C are isometric views illustrating annular stator assemblies 608a, 608b configured in accordance with representative embodiments of the present technology. As shown in FIG. 6B, the annular stator assembly 608a includes (1) an annular stator core portion 626, and (2) multiple winding portions (or winding protrusions) 628 positioned along and extending inwardly from the stator assembly 608a. The winding portions 628 can be used to position a wire winding component thereon (e.g., by winding a wire on the winding portion 628). In FIG. 6B, the winding portions 628 are radially positioned (e.g., toward a rotation axis R). In FIG. 6C, the annular stator assembly 608b can include a plurality of (e.g., six) stator segments 634a-f that are positioned adjacent to one another in a circumferential direction. In FIG. 6C, the winding portions 628 are axially positioned (e.g., generally parallel to a rotation axis R).

FIG. 6D is an isometric view illustrating one stator segment 634 configured in accordance with representative embodiments of the present technology. As shown, the stator segment 634 can include a main body 635 and one or more (e.g., four) protrusions 636 extending from the main body 635. In some embodiments, the protrusions 636 can be used to position winding components thereon. The stator segment 634 can include a hexagonal recess 646 and a hexagonal protrusion 647 on one side (e.g., the inner side of the stator segment 634). The hexagonal recess 646 is configured to fittingly accommodate another hexagonal protrusion 647 (of another stator segment 634 positioned next thereto). By this arrangement, the six stator segments 634a-f can together form the stator assembly 608b shown in FIG. 6C. In other embodiments, at least two of the six stator segments 634a-f can be coupled by glue or other suitable means. In some embodiments, the stator segment 634 can be made by winding components (e.g., wire windings).

Figure 7B:
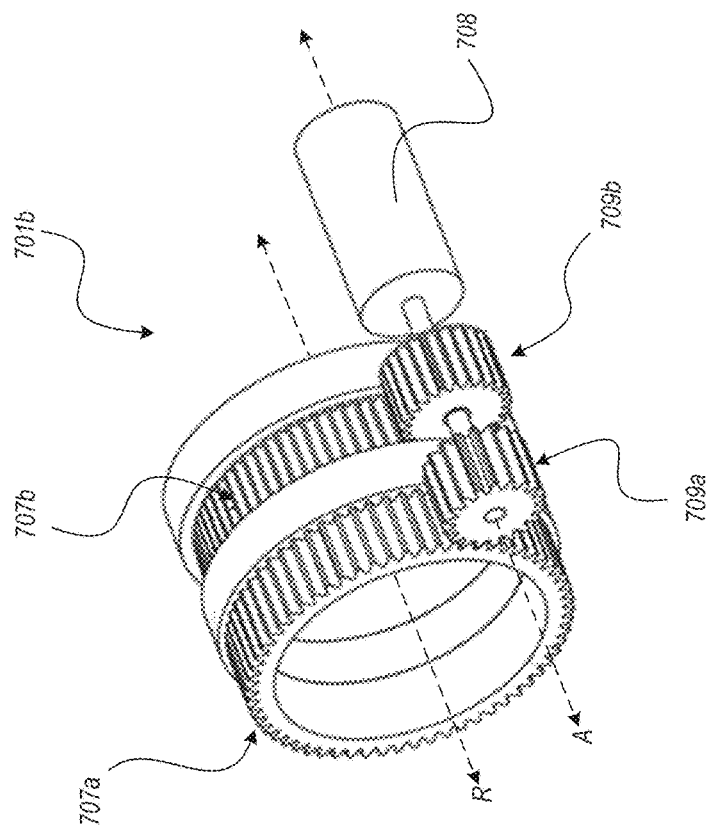
FIG. 7B is an isometric view illustrating components of a hollow assembly configured in accordance with representative embodiments of the present technology.
Figure 7A:
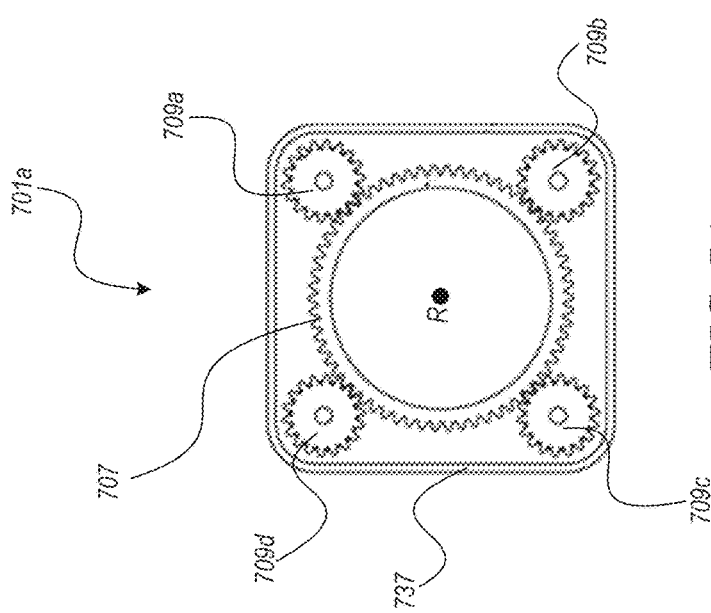
FIG. 7A is a top view illustrating components of a hollow assembly configured in accordance with representative embodiments of the present technology.

FIG. 7A is a top view illustrating components of a hollow assembly 701a configured in accordance with representative embodiments of the present technology. The hollow assembly 701a includes a housing 737 and a rotor assembly 707 positioned in the housing 737. The rotor assembly 707 is positioned to rotate about a rotation axis R. The hollow assembly 701a further includes four positioning components 709a-d positioned at the four corners of the housing 737 and external to the rotor assembly 707. The positioning components 709a-d can rotate relative to the rotor assembly 707 and maintain the (radial) location of the rotor assembly 707. At least one of the positioning components 709a-d can be coupled to a driving assembly (e.g., an electrical motor). The driving assembly provides torque to rotate the positioning components 709a-d and the rotor assembly 707.

FIG. 7B is an isometric view illustrating components of a hollow assembly 701b configured in accordance with representative embodiments of the present technology. The hollow assembly 701b includes a first rotor assembly 707a, a second rotor assembly 707b, a first positioning component 709a, a second positioning component 709b, and a driving assembly 708 (e.g., an electrical motor). The first/second rotor assemblies 707a, 707b are both positioned to rotate about a common rotation axis R. The first positioning component 709a is rotatably coupled to and positioned external to the first rotor assembly 707a. The first positioning component 709a can rotate relative to the first rotor assembly 707a and maintain the location thereof. The second positioning component 709b is rotatably coupled to and positioned external to the second rotor assembly 707b. The second positioning component 709b can rotate relative to the second rotor assembly 707b and maintain the location thereof. As shown, both the first/second positioning components 709a, 709b are coupled to and driven by the driving assembly 708 (e.g., the first and second positioning components 709a, 709b are positioned coaxially along an axial direction A). In other embodiments, the first and second positioning components 709a, 709b can be driven by separate driving assemblies. In some embodiments, the first and second positioning components 709a, 709b can be positioned differently (e.g., non-coaxially). In the illustrated embodiment, the first positioning component 709a is a first gear (e.g., having a first number of gear teeth) and the second positioning component 709b is a second gear (e.g., having a second number of gear teeth) different than the first gear. Because the first gear may have a configuration different than the second gear (e.g., a different number of teeth), the driving assembly 708 can rotate the first/second rotor assemblies 707a, 707b at different rotational speeds. In some embodiments, a first optical component can be positioned inside and fixedly coupled to the first rotor assembly 707a and a second optical component can be positioned inside and fixedly coupled to the second rotor assembly 707b. In such embodiments, the driving assembly 708 can rotate the first/second optical components at different rotational speeds.

Figure 7C:
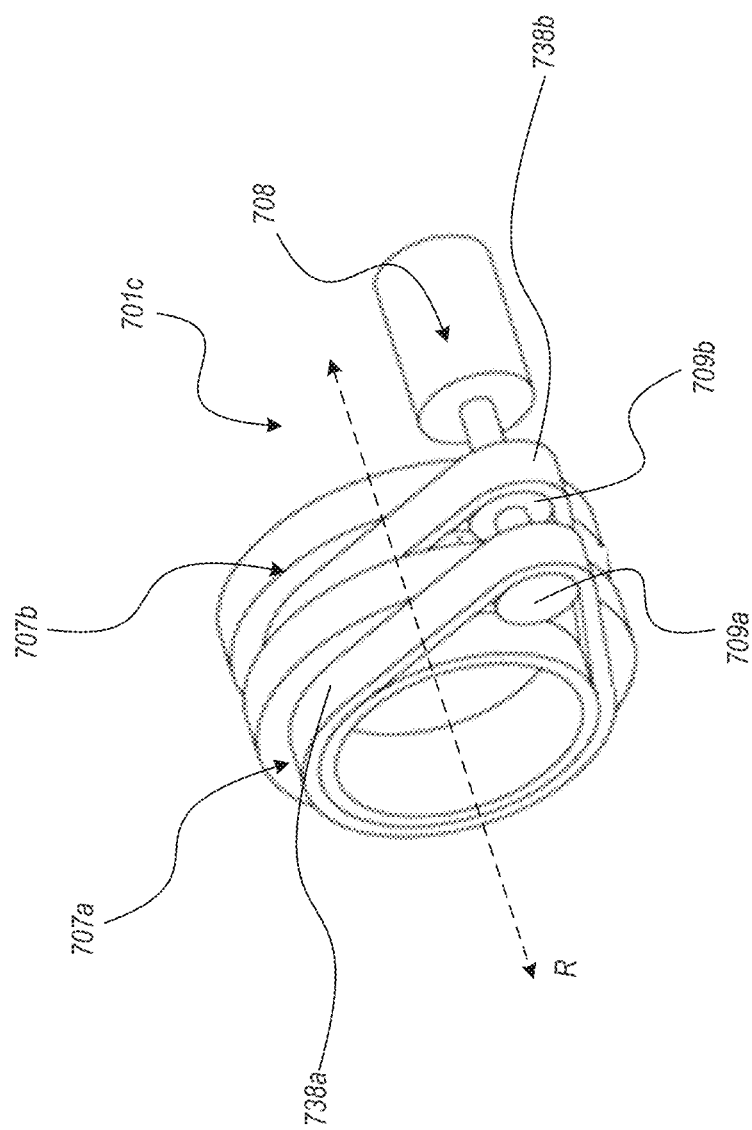
FIG. 7C is an isometric view illustrating components of another hollow assembly configured in accordance with representative embodiments of the present technology.

FIG. 7C is an isometric view illustrating components of another hollow assembly 701c configured in accordance with representative embodiments of the present technology. The hollow assembly 701c includes a first rotor assembly 707a, a second rotor assembly 707b, a first positioning component 709a, a second positioning component 709b, and a driving assembly 708. The first/second rotor assemblies 707a, 707b are both positioned to rotate about a rotation axis R. The first positioning component 709a is positioned external to and coupled with the first rotor assembly 707a via a first belt 738a. The first positioning component 709a can rotate with the first rotor assembly 707a and maintain the location thereof. The second positioning component 709b is positioned external to and coupled with the second rotor assembly 707b via a second belt 738b. The second positioning component 709b can rotate with the second rotor assembly 707b and maintain the location thereof. As shown, both the first/second positioning components 709a, 709b are coupled to and driven by the driving assembly 708. In the illustrated embodiment, the first positioning component 709a and the second positioning component 709b have a similar size/shape. Therefore, the driving assembly 708 can rotate the first/second rotor assemblies 707a, 707b at the same rotational speed. In other embodiments, the first positioning component 709a and the second positioning component 709b can have different sizes/shapes such that the driving assembly 708 can rotate the first/second rotor assemblies 707a, 707b at different rotational speeds. In some embodiments, a first optical component can be positioned inside and fixedly coupled to the first rotor assembly 707a and a second optical component can be positioned inside and fixedly coupled to the second rotor assembly 707b. In such embodiments, the driving assembly 708 can also rotate the first/second optical components.

Figure 8:
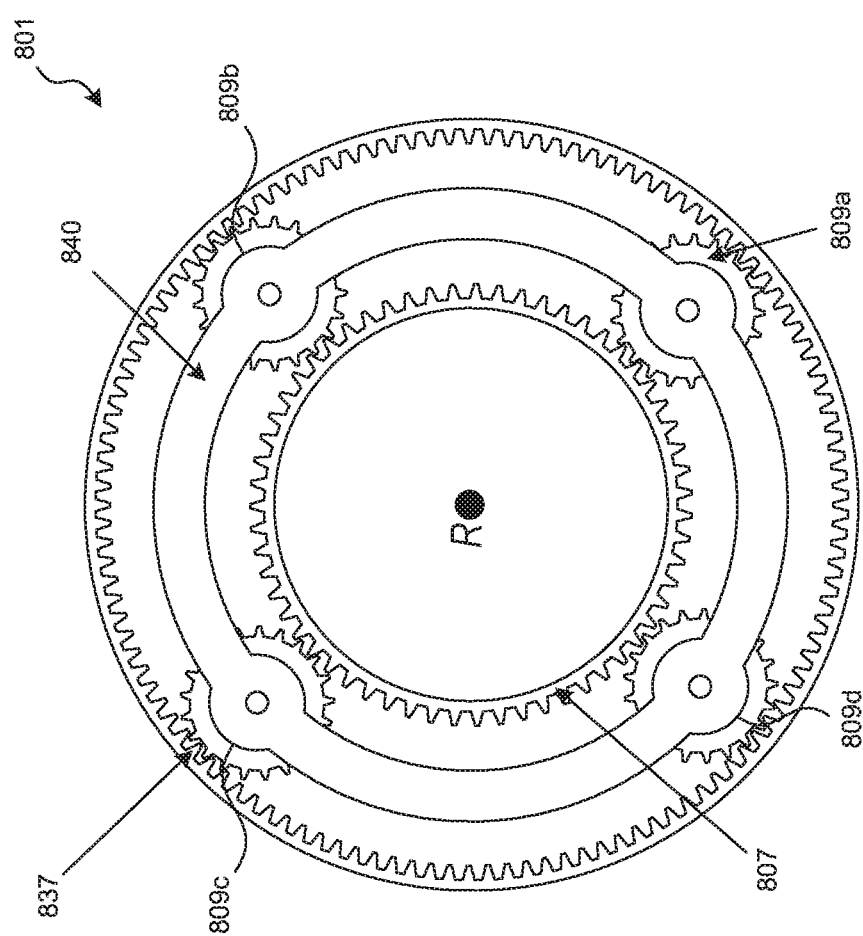
FIG. 8 is a top view illustrating components of yet another hollow assembly configured in accordance with representative embodiments of the present technology.

FIG. 8 is a top view illustrating components of a hollow assembly 801 configured in accordance with representative embodiments of the present technology. The hollow assembly 801 includes a housing (or a ring gear) 837, a rotor assembly (or a sun gear) 807, a chassis (or a planetary carrier) 840, and four positioning components (or planetary pinions) 809a-d rotatably coupled to the chassis 840. The chassis 840 can be fixed and not rotatable. The rotor assembly 807 is positioned internal to the positioning components 809a-d, the chassis 840, and the housing 837. The rotor assembly 807 can rotate with respect to a rotation axis R. At least one of the positioning components 809a-d can be coupled to a driving assembly (e.g., an electrical motor). The driving assembly provides torque to rotate the positioning components 809a-d. When the positioning components 809a-d are rotated, the rotor assembly 807 and the housing 837 are also rotated. The positioning components 809a-d can maintain the relative locations of the rotor assembly 807 and the housing 837 when they are rotated. In some embodiments, a first optical component can be coupled to and rotate with the rotor assembly 807, and a second optical component can be coupled to and rotate with the housing 837.

Figure 9A:
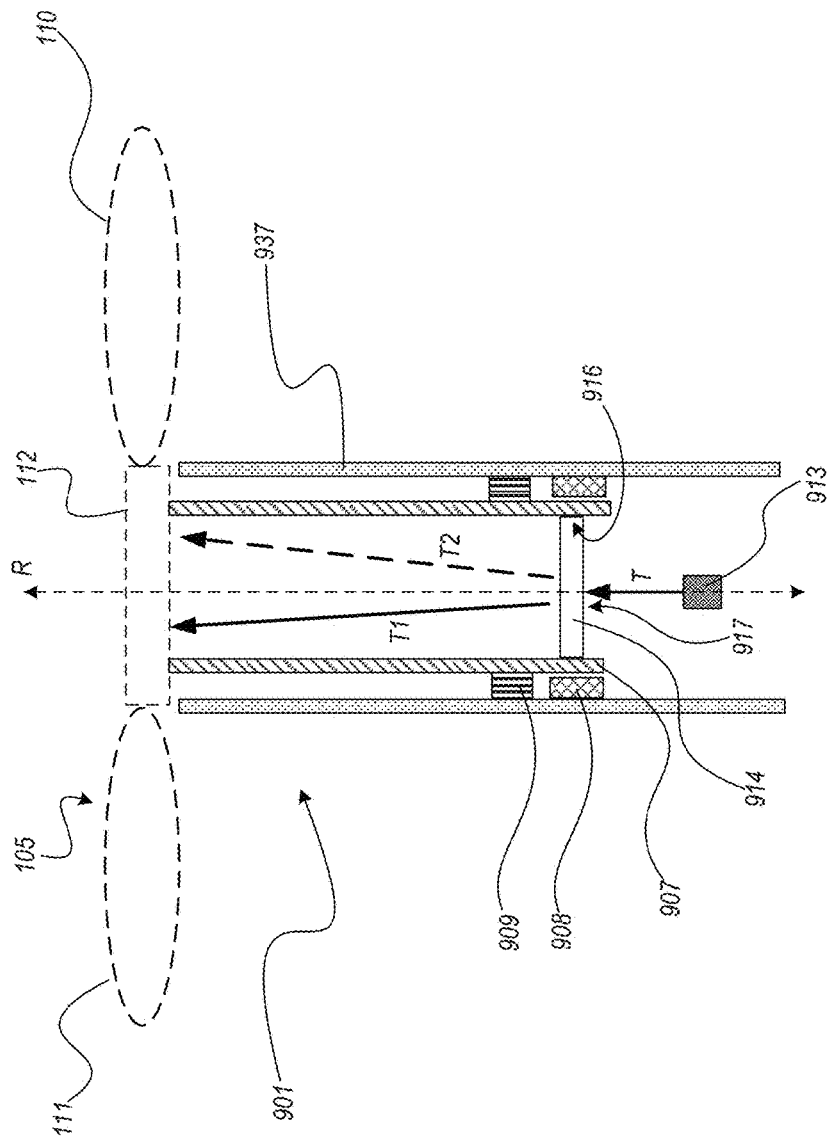
FIG. 9A is a schematic diagram illustrating components of a hollow motor assembly configured in accordance with representative embodiments of the present technology.

FIG. 9A is a schematic diagram illustrating components of a hollow motor assembly 901 configured in accordance with representative embodiments of the present technology. In the illustrated embodiments, the hollow motor assembly 901 is configured to drive an optical component 914 positioned therein. As shown, the hollow motor assembly 901 further includes a housing 937, a rotor assembly 907, a stator assembly 908 positioned external to the rotor assembly 907, a positioning component 909, and a light source 913 (e.g., a range finding/scanning component/sensor or a light source for a Lidar system). The positioning component 909 is positioned between the stator assembly 908 and the rotor assembly 907 to maintain a location of the rotor assembly 907 relative to the stator assembly 908. As shown, the stator assembly 908 is fixedly attached to the housing 937. The stator assembly 908 is positioned radially external to and coaxially with the rotor assembly 907 (relative to a rotation axis R). The rotor assembly 907 can rotate relative to the stator assembly 908. In the illustrated embodiment, the optical component 914 is coupled to and rotates with the rotor assembly 907. By this arrangement, the optical component 914 can corporate with the light source 913 to adjust the directions of the light rays (as indicated by arrows in FIG. 9A) from the light source 913 (so as to perform a scanning or range-finding task).

For example, at a first time point, the light ray from the light source 913 passes through the optical component 914 and the optical component 914 changes its direction from arrow T to arrow T1 (e.g., the optical component 914 has an asymmetric shape so it can change the direction of incoming light rays). From the first time point to a second time point, the optical component 914 has been rotated. At the second time point, the light ray from the light source 913 passes through the optical component 914 and the optical component 914 changes its direction from arrow T to arrow T2. As a result, the optical component 914 can adjust the directions of the light rays from the light source 913.

In some embodiments, the hollow motor assembly 901 can also be configured to drive a propeller 105 (of a UAV). As indicated by dashed lines, the hollow motor assembly 901 can be coupled to the propeller 105, which includes a first blade 110, a second blade 111 opposite to the first blade 110, and a hub 112. When the rotor assembly 907 rotates, the propeller 105 rotates with it.

As shown, the rotor assembly 907 has an inner surface 916 that circumferentially faces or bounds an interior chamber (or interior space) 917. The interior chamber 917 can be used to accommodate the optical component 914. The optical component 914 is fixedly coupled to the rotor assembly 907. In some embodiments, the optical component 914 and the rotor assembly 907 can be coupled by a mechanical mechanism (e.g., a connecting component, a screw, a bolt, a nail, a paired recess and protrusion, a wedge, and/or other suitable mechanisms). In some embodiments, the optical component 914 and the rotor assembly 907 can be coupled with/using glue. When the rotor assembly 907 rotates, the optical component 914 rotates with it. Examples of the optical component 914 include a lens, a prism, or a combination thereof.

As shown in FIG. 9A, the light source 913 can be positioned at the center of the hollow motor assembly 901 (e.g., on the rotation axis R). In some embodiments, the light source 913 can be positioned at other locations in the housing 937 (e.g., off the rotation axis R). In other embodiments, the light source 913 can be fixedly attached to (an inner surface of) the housing 937. In some embodiment, the light emitted from the light source can be collimated or adjusted before it reaches the optical component 914.

In the embodiments where the hollow motor assembly 901 is coupled to the propeller 105, the light source 913 can emit light rays to the propeller 105 through the optical component 914. The optical component 914 can change the directions of the light rays (as indicated by arrows in FIG. 9A) and then further direct them to the propeller 105. By rotating the optical component 914 and the rotor assembly 907, the directions of the light rays can be controlled. Accordingly, the incoming angles of the light rays can be controlled when the light rays enter into the propeller 105. By so doing, the light rays emitted from the propeller 105 can accordingly be controlled.

For example, in response to receiving the incoming light rays with different incoming angles, the propeller 105 can accordingly generate various visual indications (e.g., by redirecting/reflecting the light rays with different incoming angles). In some embodiments, the propeller 105 can include a light guide structure, which further includes: (1) a light entrance portion configured/positioned to receive a light ray from the hollow motor assembly 901; (2) a light transmission portion configured/positioned to transmit the light ray; and (3) a light exit portion configured/positioned to direct the light ray toward a target (e.g., an operator, a bystander, and/or a target surface) in one or more directions. In some embodiments, the visual indication can include an outer contour of the propeller 105 or a UAV. In some embodiments, the visual indication can be indicative of a location of a UAV (or the location of a UAV component). In some embodiments, the visual indication can be indicative of a status/parameter of a UAV (e.g., travel direction, orientation, and/or flight status).

Figure 9C:
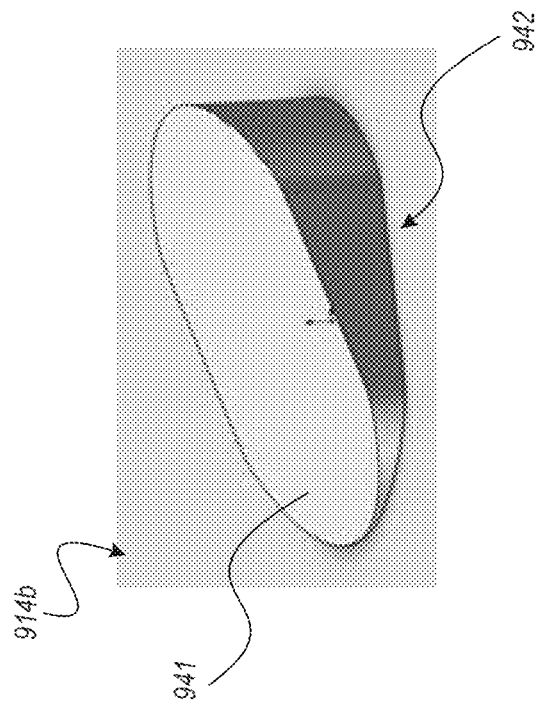
FIGS. 9B and 9C are isometric views illustrating multiple optical components configured in accordance with embodiments of the present technology.
Figure 9B:
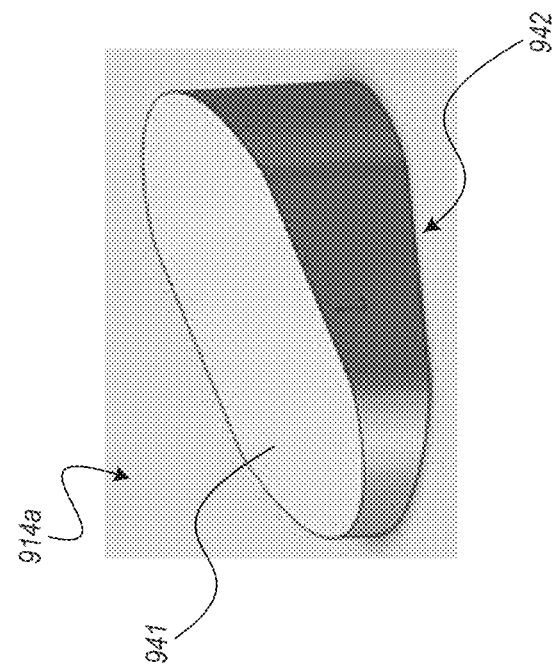

FIGS. 9B and 9C are isometric views illustrating optical component 914*a*, 914*b* configured in accordance with multiple embodiments of the present technology. As shown in FIG. 9B, one optical component 914*a* can have an elliptical-cylinder shape. As shown in FIG. 9C, another optical component 914*b* can have an elliptical-wedge shape. In other embodiments, the optical components can be formed as a cylinder or can have other suitable shapes. Both the optical components 914*a*, 914*b* can have a first surface 941 and a second surface 942 opposite to the first surface 941. In the illustrated embodiment, the first surface 941 and the second surface 942 are not generally parallel to each other. In other embodiments, the first surface 941 and the second surface 942 can be generally parallel to each other. In the illustrated embodiment, the first surface 941 and the second surface 942 are both flat surfaces. In other embodiments, however, one or both of the first/second surfaces 941, 942 can be a curved surface (e.g., as the dashed lines shown in FIG. 10), a rough surface, a teethed surface, or a combination thereof. For example, when a user wants to focus light rays, the user can choose a convex optical component with one or two curved surfaces. As another example, when a user needs to diffuse light rays, the user can select an optical component with one or two teethed/rough surfaces.

Figure 10:
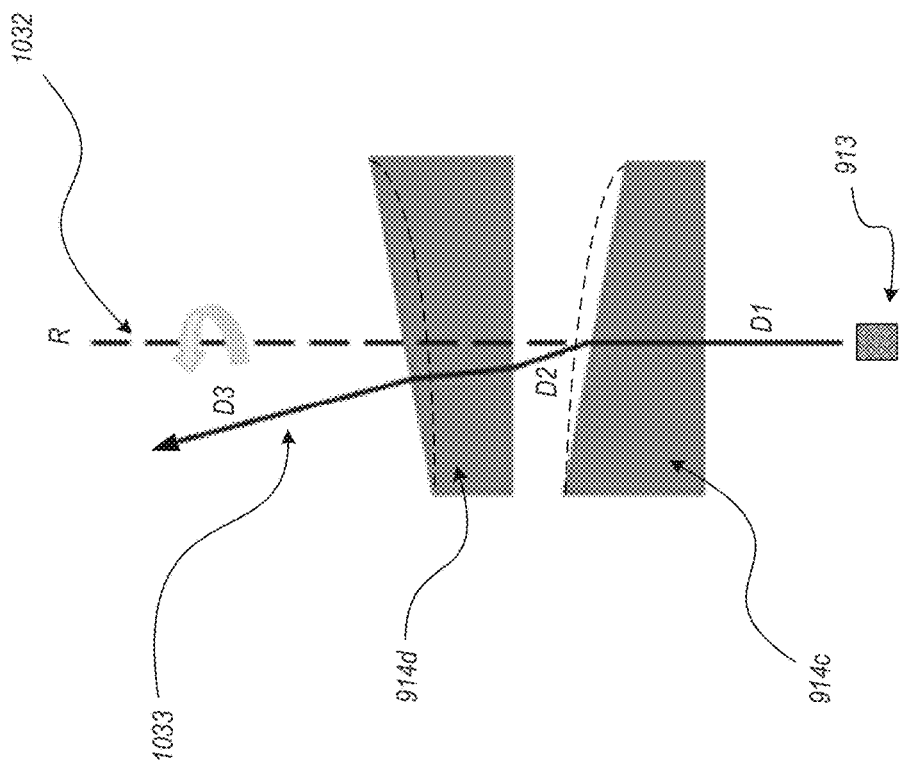
FIG. 10 is a schematic diagram illustrating multiple optical components configured in accordance with embodiments of the present technology.

FIG. 10 is a schematic diagram illustrating the use of multiple optical components in accordance with embodiments of the present technology. The present technology can be used to change/control the light pathways of multiple light rays that pass through the multiple optical components. The ability to control the light pathways is important in certain technical fields such as distance measurement by emitting/receiving laser beams. As shown in FIG. 10, a light source 913, a first optical component 914*c* and a second optical component 914*d* are positioned along a rotation axis R. The first optical component 914*c* and the second optical component 914*d* can rotate at different rotational speeds and/or directions. For example, the first optical component 914*c* can be fixedly coupled to a first rotor assembly, and the second optical component 914*d* can be fixedly coupled to a second rotor assembly. The first/second rotor assemblies can be independently controlled/rotated. The light source 913 can direct a light ray to the first optical component 914*c* along the rotation axis R (indicated as D1 in FIG. 10). The first optical component 914*c* then changes the direction of the incoming light ray from D1 to D2. The second optical component 914*d* then further changes the direction of the incoming light ray from D2 to D3. By rotating the first optical component 914*c* and the second optical component 914*d*, a user can precisely control the direction of the light ray emitted from the light source 913. (To clarify, in such embodiments, the first/second rotor assemblies are only used to rotate the first/second optical components 914*c*, 914*d*, and are not used to rotate a propeller.)

Figure 11A:
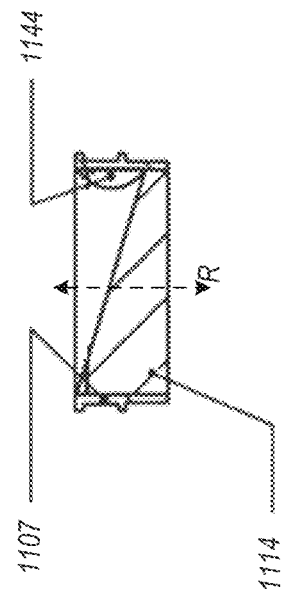
FIGS. 11A and 11B are schematic diagrams illustrating a counterweight configured in accordance with representative embodiments of the present technology.
Figure 11B:
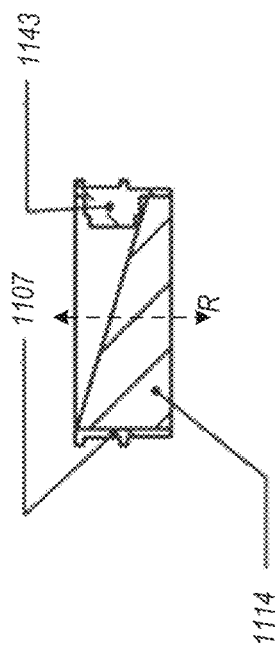

The optical components described above may have asymmetric shapes. When rotated, these components may be unbalanced. Particular embodiments of the present technology can address this potential issue. For example, FIGS. 11A and 11B are schematic diagrams illustrating counterweights 1143, 1144 configured in accordance with representative embodiments of the present technology. In FIGS. 11A and 11B, an optical component 1114 is fixedly coupled to a rotor assembly 1107. The optical component 1114 and the rotor assembly 1107 are positioned to rotate together about a rotation axis R. As shown, the optical component 1114 has an asymmetric shape. After a rotation-balance analysis (discussed below with reference to FIG. 12), the shapes, materials, and/or weights of the counterweights 1143, 1144 can be determined. The locations to position or install the counterweights 1143, 1144 can also be determined. As shown in FIG. 11A, the counterweight 1143 can be a counterweight block fixedly attached to the inner surface of the rotor assembly 1107. In FIG. 11B, the counterweight 1144 can be glue attached to the inner surface of the rotor assembly 1107. The optical component 1114 in FIG. 11B can have a better light transmission rate than the optical component 1114 in FIG. 11A, at least because the counterweight 1144 blocks less light passage than does the counterweight 1143. In some embodiments, the counterweights 1143, 1144 can be made of materials with different densities. In some embodiments, to enhance the light transmission rate of the optical component 1114, the shapes, transparency, or other suitable parameters of the counterweights 1143, 1144 can also be considered. In other embodiments, the counterweights 1143, 1144 can be positioned in other locations such as an edge or a peripheral portion of the rotor component 1107. In some embodiments, the numbers of the counterweights 1143, 1144 can vary.

In some embodiments, instead of adding a counterweight, the optical component 1114 can be balanced by removing a portion thereof. In some embodiments, the optical component 1114 can be reshaped so as to balance its rotation. In some embodiments, the rotor assembly 1107 can be balanced in similar ways, alone or in conjunction with balancing the optical component 1114.

Figure 12:
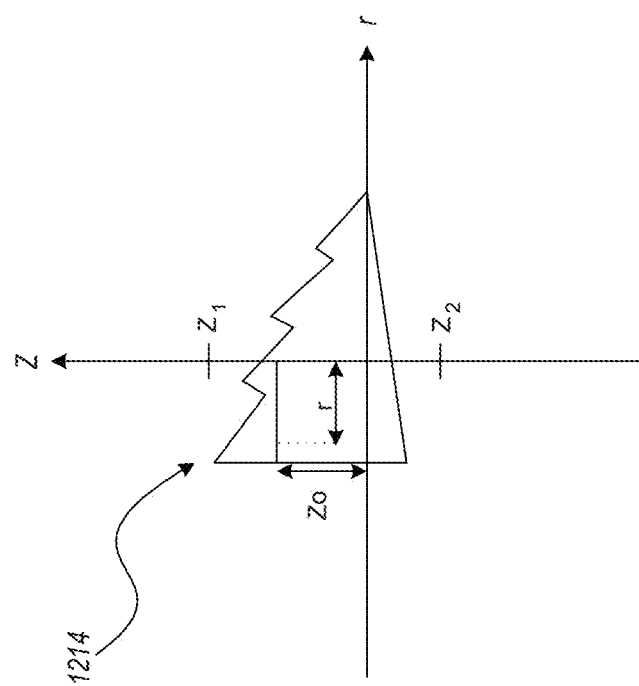
FIG. 12 is a schematic diagram illustrating a rotation-balance analysis for an optical component configured in accordance with representative embodiments of the present technology.

FIG. 12 is a schematic diagram illustrating a rotation-balance analysis for an optical component 1214 configured in accordance with representative embodiments of the present technology. As shown, the optical component 1214 has an asymmetric shape and therefore it may not rotate in a balanced manner about a rotation axis Z. The present technology provides a method for effectively and efficiently determining how to balance an optical component having an asymmetric shape. The method is based in part on the mass and the density of the optical component.

First, the method includes calculating the product of the mass (m) and a radius vector (r) for each layer of the optical component, based on the integral Equation (A) below:

$$P_z = \iint_s \rho \vec{r} \, ds \quad (A)$$

In Equation (A) above, "$P_z$" represents the "unbalance" value at level Z, "S" represents the cross-sectional area of level Z, "$\rho$" represents the density of the optical component at level Z, and "$\vec{r}$" represents radius vector.

The method then decomposes the calculated product value to two or more levels. For example, as shown in FIG. 12, the calculated product value can be decomposed to level $Z_1$ and $Z_2$, according to Equations (B) and (C) below.

$$P_1 = \iiint_v \frac{Z - Z_2}{Z_1 - Z_2} \rho \vec{r} \, dV \quad (B)$$

$$P_2 = \iiint_v \frac{Z_1 - Z}{Z_1 - Z_2} \rho \vec{r} \, dV \quad (C)$$

In Equations (B) and (C) above, "$P_1$" represents the "unbalance" value at level $Z_1$, "$P_2$" represents the "unbalance" value at level $Z_2$, "V" represents the volume of the optical component, "Z" is the height variable, "$\rho$" represents the density of the optical component at level Z, and "$\vec{r}$" represents the radius vector. Based on Equations (A), (B) and (C) above, a user can determine the "unbalance" amount (e.g., how much weight to be added) to be added (or removed, in some embodiments) at specific levels (e.g., levels $Z_1$ and $Z_2$).

Below is an example showing how the "unbalance" value can be calculated for a prism having a right-triangle cross-section. Assume that the height of the prism is "H" and the radius of the prism is "r," and then the "unbalance" value "$P_{Z0}$" at level $Z_0$ can be calculated as follows:

$$dP_{z0} = \iint_s \vec{r}_{xy} \, dm = \iint_s (x \cdot \vec{i} + y \cdot \vec{j}) \, dm = 0 \cdot \vec{i} + \iint_s y \cdot \rho \, dx \, dy \, dz_0 \cdot \vec{j} \quad (D)$$

In Equation (D) above, "S" represents the (cross-sectional) area of level $Z_0$, which can be defined by the circle "$x^2 + y^2 = R^2$" and the line "$y = y_0$." "$\vec{r}_{xy}$" represents the radius vector from point (x, y) to the rotation axis of the prism. "$\rho$" represents the density of the prism. The "unbalance" value at level $Z_0$ can be further calculated based on Equations (E), (F), and (G) below.

$$dP_{z0} = \int_{-\sqrt{R^2-y^2}}^{\sqrt{R^2-y^2}} dx \int_{-R}^{y_0} \rho y \, dy \, dz_0 = \rho \frac{2}{3}(R^2 - y_0^2)^{\frac{3}{2}} dz_0 \quad (E)$$

$$y_0 = -\frac{2R}{H} z_0 \quad (F)$$

$$dP_{z0} = \rho \frac{2}{3} \left(R^2 - \frac{4R^2 z_0^2}{H^2}\right)^{\frac{3}{2}} dz_0 \quad (G)$$

The method can further decompose the "unbalance" value to two levels, "Z=H/2" and "Z=−H2." The method can then integrally calculate the "unbalance" values for all levels "$Z=Z_0$." As a result, the "unbalance" values at these two levels ($P_I$ and $P_{II}$) can be based on Equations (H), (I), (J), and (K) below.

$$dP_I = \frac{\frac{H}{2} + z_0}{H} \cdot dP_{z0} \quad (H)$$

$$dP_{II} = \frac{\frac{H}{2} - z_0}{H} \cdot dP_{z0} \quad (I)$$

$$P_1 = \int_{-\frac{H}{2}}^{\frac{H}{2}} dP_1 = \frac{\pi\rho}{16} HR^3 \quad (J)$$

$$P_{II} = \int_{-\frac{H}{2}}^{\frac{H}{2}} dP_{II} = \frac{\pi\rho}{16} HR^3 \quad (K)$$

Figure 13:
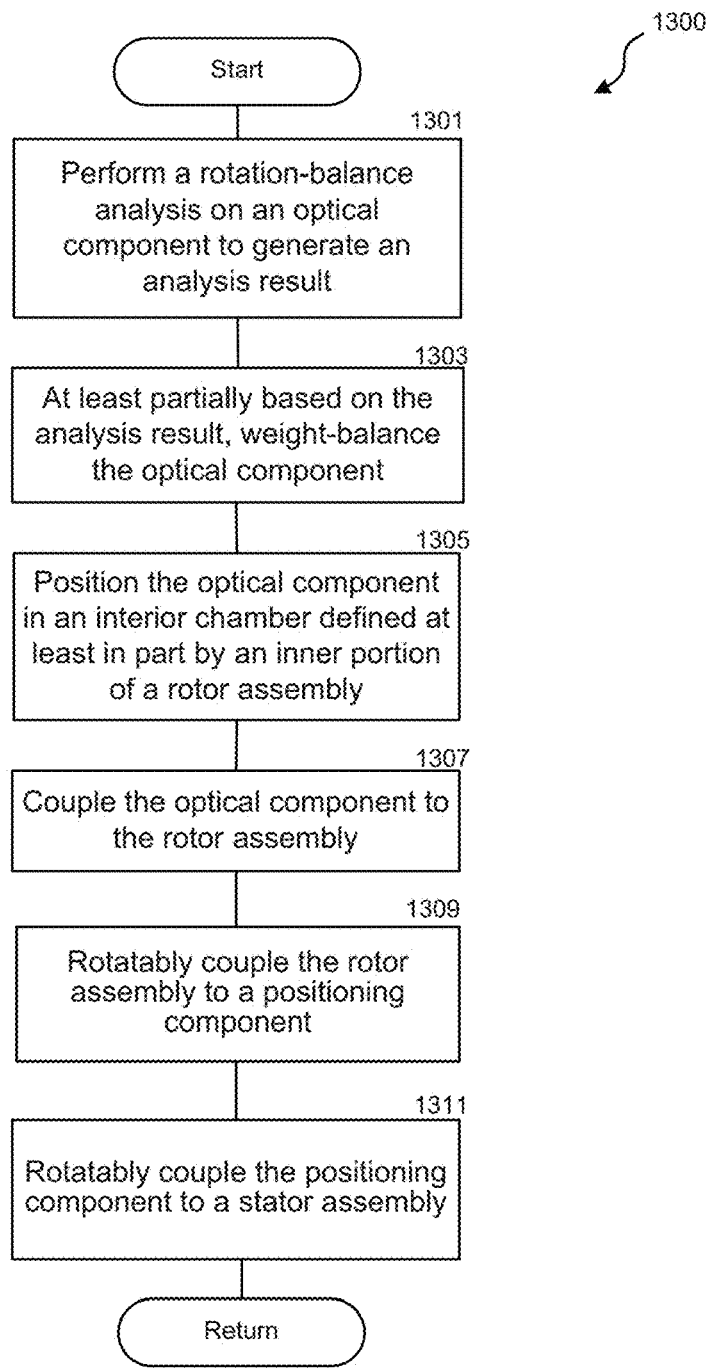
FIG. 13 is a flowchart illustrating a method in accordance with representative embodiments of the present technology.

FIG. 13 is a flowchart illustrating embodiments of a method 1300 for manufacturing (or assembling) a hollow motor apparatus in accordance with representative embodiments of the present technology. At block 1301, the method 1300 includes performing a rotation-balance analysis on an optical component to generate an analysis result. Embodiments of the rotation-balance analysis can be found in the descriptions above with reference to FIG. 12. The analysis result shows a user whether the optical component needs to be balanced. At block 1303, the method 1300 can include weight-balancing the optical component at least partially based on the result of the analysis. In some embodiments, a counterweight (e.g., a weight block, glue, and/or other suitable weights) can be coupled to the optical component to balance the optical component. In some embodiments, a portion of the optical component can be removed so as to balance the optical component. In some embodiments, the optical component can be reshaped to be balanced. Embodiments of the balance process can be found in the descriptions above with reference to FIG. 11.

At block 1305, the method 1300 includes positioning the optical component in an interior chamber defined at least in part by an inner portion of a rotor assembly. Embodiments of the interior chamber include interior chambers 117, 517, and 917 discussed above. At block 1307, the method 1300 includes coupling the optical component to the rotor assembly. At block 1309, the rotor assembly is rotatably coupled to a positioning component. In some embodiments, the positioning component can be a bearing assembling. In some embodiments, the positioning component can be a bearing, gear, puller, a roller, and/or other suitable components. At block 1311, the positioning component is rotatably coupled to a stator assembly. The positioning component is positioned external to the inner portion of the rotor assembly to maintain a location of the rotor assembly relative to the stator assembly.

Figure 14:
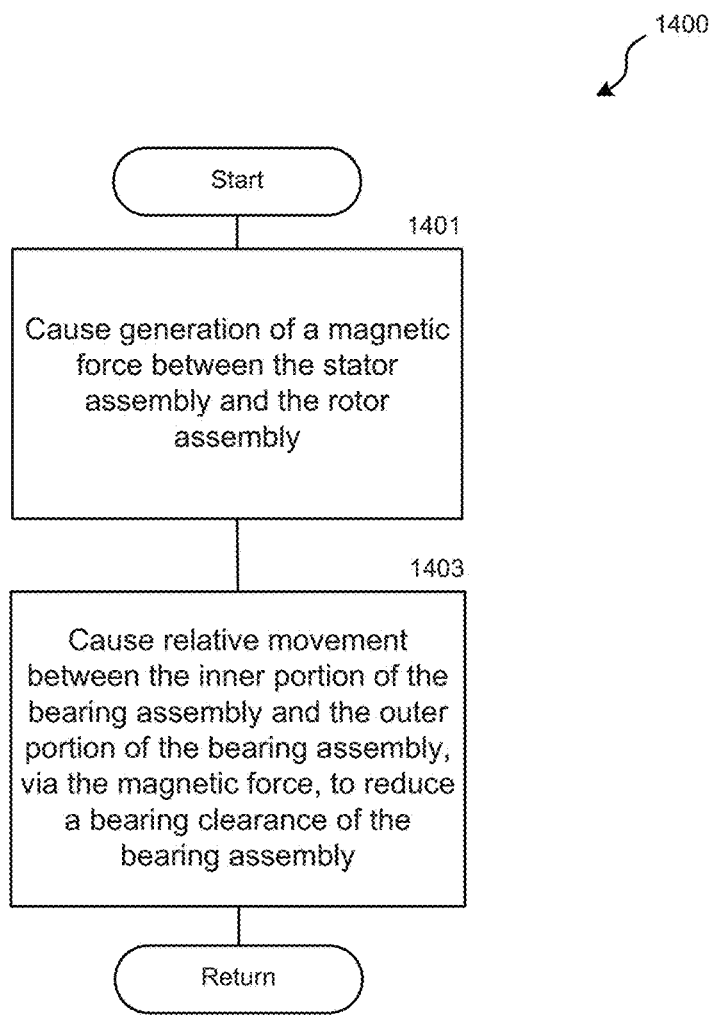
FIG. 14 is a flowchart illustrating a method in accordance with representative embodiments of the present technology.

FIG. 14 is a flowchart illustrating embodiments of a method 1400 for pre-positioning a bearing assembly in a hollow motor apparatus in accordance with representative embodiments of the present technology. The hollow motor apparatus includes a rotor assembly having a rotation axis and a stator assembly coaxially positioned adjacent to the rotor assembly. The bearing assembly is configured to maintain the location of the rotor assembly relative to the stator assembly. The bearing assembly includes (1) an inner portion coupled to the rotor assembly, (2) an outer portion positioned axially external to the inner portion, and (3) more than one rolling component rotatably positioned between the inner portion and the outer portion. Embodiments of the inner portion, the outer portion, and the rolling component are discussed in detail with reference to FIGS. 5F and 5G. At block 1401, the method 1400 includes causing generation of a magnetic force between the stator assembly and the rotor assembly. At block 1403, the method includes causing relative movement between the inner portion of the bearing assembly and the outer portion of the bearing assembly, via the magnetic force, to reduce a bearing clearance of the bearing assembly.

As discussed above, aspects of the present technology provide an improved hollow motor assembly that enables a user to position an optical component therein such that the component can rotate with a rotor assembly of the hollow motor assembly. The rotor assembly can be coupled to and rotate a propeller of a UAV. In addition to driving the propeller, the hollow motor assembly can also illuminate the propeller by having a light source positioned therein. The propeller can receive light from the light source (the light passes through the rotatable optical component), and then generate a visual indication to convey information (e.g., a status) associated with the UAV to an operator. Accordingly, the operator can effectively learn the information (e.g., orientation, location, flight status, and/or other suitable status) of the UAV in a straight-forward manner. It is especially helpful for unsophisticated or relatively new UAV operators, at least because the discussed technology can help them properly control the UAV. Another advantage includes that the hollow motor assembly can have a compact design. Accordingly, it can be implemented in a traditional UAV by simply replacing a traditional motor assembly by the hollow motor assembly of the present technology, without requiring extra space for installation.

The present technology also provides a hollow apparatus that can include multiple hollow, annular structures that can independently rotate. Each annular structure can be coupled to a corresponding optical component and rotate the same. In particular embodiment, the hollow apparatus can be implemented as a laser distance-measuring device. That device can include a laser light source positioned therein and configured to emit laser rays, through the optical components, to a target surface. By (1) directing the laser rays to pass the optical components and (2) controlling the rotation of the optical components, the device can generate various desirable laser rays (e.g., focused, parallel, in a particular direction, and/or other suitable characteristics) that can be used to measure different types of target surfaces (e.g., rough, smooth, teethed, angled or a combination thereof). It is also advantageous that the device can have a compact design, such that a user can carry it or it can be easily installed in other devices (e.g. a vehicle or UAV).

From the foregoing, it will be appreciated that specific embodiments of the technology have been described herein for purposes of illustration, but that various modifications may be made without deviating from the technology. For example, particular embodiments were described above in the context of a hollow motor apparatus. In other embodiments, the present technology can be implemented by other suitable rotatable hollow annular structure (e.g., a laser emitter with a hollow annular structure). The hollow motor assemblies can include different numbers of stator portions, bearing assemblies, and/or other elements that are specifically illustrated herein.

Further, while advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

We claim:

1. A hollow motor apparatus, comprising:
   a rotor assembly rotatable 360° about a rotation axis, the rotor assembly having an inner portion disposed around an opening that is configured to receive at least a portion of a payload, the payload including an optical component that is rotatable, in place, with the rotor assembly, 360° about the rotation axis,
   a stator assembly positioned adjacent to the rotor assembly and coaxially with the rotor assembly relative to the rotation axis;
   a bearing assembly disposed outside the inner portion of the rotor assembly and operably coupled to the rotor assembly, the bearing assembly configured to maintain a position of the rotor assembly relative to the stator assembly; and
   a counterweight coupled to the rotor assembly and positioned to enable balanced rotation of the optical component with respect to the rotation axis.

2. The apparatus of claim 1, wherein the optical component comprises a lens.

3. The apparatus of claim 1, wherein the optical component comprises a prism.

4. The apparatus of claim 1, wherein the optical component is a first optical component, and wherein the apparatus further comprises a second optical component positioned to rotate about the rotation axis.

5. The apparatus of claim 4, wherein the first optical component is configured to rotate at a first rotational speed, and wherein the second optical component is configured to rotate at a second rotational speed different than the first rotational speed.

6. The apparatus of claim 1, wherein the optical component has an asymmetric shape.

7. The apparatus of claim 1, wherein the stator assembly is positioned in a first plane generally perpendicular to the rotation axis, and wherein the bearing assembly is positioned in a second plane generally perpendicular to the rotation axis, the second plane being different than the first plane.

8. The apparatus of claim 7, wherein the rotor assembly comprises a magnet yoke and at least one magnet coupled to the magnet yoke, and wherein the at least one magnet is positioned between the stator assembly and the bearing assembly, and wherein the magnet yoke comprises a first portion generally parallel to the first plane and a second portion generally perpendicular to the first plane.

9. The hollow motor apparatus of claim 1, wherein:
   the payload comprises an optical component;
   the optical component is coupled to the inner portion of the rotor assembly;
   the rotation axis passes through a first surface and a second surface of the optical component;
   the first surface and the second surface are on opposite sides of the optical component; and
   the optical component has an asymmetric shape.

10. The apparatus of claim 1, wherein the optical component is configured to steer one or more light beams in different directions during rotation.

11. A hollow motor apparatus, comprising:
    a rotor assembly rotatable 360° about a rotation axis, the rotor assembly having an inner portion disposed around an opening that is configured to receive at least a portion of a payload, the payload including an optical component that is rotatable, in place, with the rotor assembly, 360° about the rotation axis,
    a stator assembly positioned adjacent to the rotor assembly and coaxially with the rotor assembly relative to the rotation axis;
    a bearing assembly disposed outside the inner portion of the rotor assembly and operably coupled to the rotor assembly, the bearing assembly configured to maintain a position of the rotor assembly relative to the stator assembly; and
    a counterweight coupled to the optical component and positioned to enable balanced rotation of the optical component with respect to the rotation axis.

12. The apparatus of claim 11, wherein the counterweight is positioned adjacent to a peripheral portion of the optical component.

13. A hollow motor apparatus, comprising:
    a rotor assembly rotatable 360° about a rotation axis, the rotor assembly having an inner portion disposed around an opening that is configured to receive at least a portion of a payload, the payload including an optical component that is rotatable, in place, with the rotor assembly, 360° about the rotation axis,
    a stator assembly positioned adjacent to the rotor assembly and coaxially with the rotor assembly relative to the rotation axis; and
    a bearing assembly disposed outside the inner portion of the rotor assembly and operably coupled to the rotor assembly, wherein the bearing assembly is configured to maintain a position of the rotor assembly relative to the stator assembly, and wherein the bearing assembly comprises an inner portion coupled to the rotor assembly and an outer portion positioned radially external to the inner portion.

14. The apparatus of claim 13, wherein a magnetic force between the stator assembly and the rotor assembly moves the inner portion, along a direction generally parallel to the rotation axis.

15. The apparatus of claim 14, wherein the bearing assembly further comprises one or more rolling components rotatably positioned between the inner portion and the outer portion, and wherein, when the inner portion moves axially relative to the outer portion to reduce an axial clearance of the one or more rolling components.

16. The apparatus of claim 15, wherein the rotor assembly comprises a magnet, and wherein, when an electrical current flows in the stator assembly, a first edge of the magnet is positioned substantially flush with a second edge of the stator assembly.

17. The apparatus of claim 15, wherein the rotor assembly comprises a magnet, and wherein, when no electrical current flows in the stator assembly, a first edge of the magnet is not positioned flush with a second edge of the stator assembly.

18. The apparatus of claim 15, wherein the rotor assembly comprises a magnet, and wherein a gap exists between the magnet and stator assembly.

19. The apparatus of claim 18, wherein, when an electrical current flows in the stator assembly, the magnet moves toward the stator assembly and a size of the gap is decreased.

20. The apparatus of claim 18, wherein, when an electrical current flows in the stator assembly, the magnet moves toward the stator assembly and a size of the gap is decreased.

21. The apparatus of claim 15, wherein the rotor assembly comprises a magnet, and wherein, when an electrical current flows in the stator assembly, a first edge of the magnet is positioned substantially flush with a second edge of the stator assembly.

22. The apparatus of claim 14, wherein the bearing assembly further comprises one or more rolling components rotatably positioned between the inner portion and the outer portion, and wherein, when the inner portion moves axially relative to the outer portion to reduce an axial clearance of the one or more rolling components.

23. The apparatus of claim 15, wherein the rotor assembly comprises a magnet, and wherein, when no electrical current flows in the stator assembly, a first edge of the magnet is not positioned flush with a second edge of the stator assembly.

24. The apparatus of claim 15, wherein the rotor assembly comprises a magnet, and wherein a gap exists between the magnet and stator assembly.

25. A hollow motor apparatus for an unmanned aerial vehicle (UAV), the apparatus comprising:
- a propeller, wherein the propeller comprises
  - a light entrance portion configured to receive a light ray from a light source coupled to the UAV;
  - a light exit portion configured to direct the light ray away from the propeller; and
  - a light transmission portion connecting the light entrance portion and the light exit portion and configured to transmit the light ray from the light entrance portion toward the light exit portion;
- a rotor assembly rotatable 360° about a rotation axis and coupled to the propeller, the rotor assembly having an inner portion disposed around an opening that is configured to receive at least a portion of a payload, the payload including an optical component that is rotatable, in place, with the rotor assembly, 360° about the rotation axis;
- a stator assembly positioned adjacent to the rotor assembly and coaxially with the rotor assembly relative to the rotation axis; and
- a bearing assembly disposed outside the inner portion of the rotor assembly and operably coupled to the rotor assembly, the bearing assembly configured to maintain a position of the rotor assembly relative to the stator assembly.

26. A hollow motor apparatus, comprising:
- a rotor assembly rotatable about a rotation axis, the rotor assembly having an inner portion disposed around an opening that is configured to receive at least a portion of a payload;
- a stator assembly positioned adjacent to the rotor assembly and coaxially with the rotor assembly relative to the rotation axis; and
- a bearing assembly disposed outside the inner portion of the rotor assembly and operably coupled to the rotor assembly, the bearing assembly configured to maintain a position of the rotor assembly relative to the stator assembly, wherein the bearing assembly comprises an inner portion coupled to the rotor assembly and an outer portion positioned radially external to the inner portion, and wherein a magnetic force between the stator assembly and the rotor assembly moves the inner portion, along a direction generally parallel to the rotation axis.

27. The apparatus of claim 26, wherein at least one of the rotor assembly and the optical component is shaped such that the rotor assembly and the optical component are rotatable in a balanced manner with respect to the rotation axis.

28. A hollow motor apparatus for an unmanned aerial vehicle (UAV), the apparatus comprising:
- a propeller having:
  - a light entrance portion configured to receive a light ray from a light source coupled to the UAV;
  - a light exit portion configured to direct the light ray away from the propeller; and
  - a light transmission portion connecting the light entrance portion and the light exit portion and configured to transmit the light ray from the light entrance portion toward the light exit portion; and
- a rotor assembly rotatable about a rotation axis and coupled to the propeller, the rotor assembly having an inner portion disposed around an opening that is configured to receive at least a portion of a payload;
- a stator assembly positioned adjacent to the rotor assembly and coaxially with the rotor assembly relative to the rotation axis; and
- a bearing assembly disposed outside the inner portion of the rotor assembly and operably coupled to the rotor assembly, the bearing assembly configured to maintain a position of the rotor assembly relative to the stator assembly.

* * * * *